United States Patent
Kujirai et al.

(10) Patent No.: US 8,451,474 B2
(45) Date of Patent: May 28, 2013

(54) METHOD OF PROTECTING LEAKAGE OF INFORMATION, AND INFORMATION PROCESSING APPARATUS AND DRIVER PROGRAM WHICH IMPLEMENT THE METHOD

(75) Inventors: Yasuhiro Kujirai, Maidenhead (GB); Tatsuro Uchida, Yokohama (JP); Masanori Aritomi, Tokyo (JP); Hiroaki Nakata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1171 days.

(21) Appl. No.: 11/283,145

(22) Filed: Nov. 18, 2005

(65) Prior Publication Data

US 2006/0110200 A1 May 25, 2006

(30) Foreign Application Priority Data

Nov. 24, 2004 (JP) ................... 2004-339440

(51) Int. Cl.
*G06F 3/12* (2006.01)
(52) U.S. Cl.
USPC .......... 358/1.15; 717/128; 717/151; 717/154; 717/155; 358/1.9; 358/1.16
(58) Field of Classification Search
USPC ............... 358/1.15; 717/151, 154, 155, 128
See application file for complete search history.

(56) References Cited

U.S. PATENT DOCUMENTS

| | | | | |
|---|---|---|---|---|
| 5,299,026 A * | 3/1994 | Vincett et al. | ................ | 358/401 |
| 6,202,092 B1 * | 3/2001 | Takimoto | ...................... | 709/225 |
| 6,313,920 B1 * | 11/2001 | Dresevic et al. | ............. | 358/1.11 |
| 6,618,566 B2 * | 9/2003 | Kujirai et al. | ................... | 399/79 |
| 6,825,943 B1 * | 11/2004 | Barry et al. | ................. | 358/1.15 |
| 7,010,593 B2 * | 3/2006 | Raymond | .................... | 709/224 |
| 7,420,696 B2 * | 9/2008 | Nakagawa | ................... | 358/1.15 |
| 2001/0053295 A1 | 12/2001 | Kujirai et al. | | |

(Continued)

FOREIGN PATENT DOCUMENTS

| | | |
|---|---|---|
| CN | 1264862 A | 8/2000 |
| CN | 1446693 A | 10/2003 |

(Continued)

OTHER PUBLICATIONS

The above references were cited in a Sep. 10, 2009 European Search Report of the counterpart European Patent Application No. 05257183.3.

*Primary Examiner* — Benjamin O Dulaney
(74) *Attorney, Agent, or Firm* — Cowan, Liebowitz & Latman, P.C.

(57) ABSTRACT

A host computer which generates a print job subjected to printing by a printer stores a drawing command output from an application in a spool file via a graphic engine. A spool system, the graphic engine, and a job chasing function processing unit execute a chasing data generation process by using the drawing command. The spool system, the graphic engine, and a graphics control unit execute a print data generation process by using the same drawing command. At this time, the drawing command is read out and output so as to successively execute the chasing data generation process and print data generation process. With this configuration, there are provided a method of protecting leakage of information by which the contents of information can be reliably chased without requiring either a special application or a device having a special function and posing any restriction on the read or output path, and an information processing apparatus and driver program which implement the method.

18 Claims, 25 Drawing Sheets

U.S. PATENT DOCUMENTS

| | | |
|---|---|---|
| 2003/0011800 A1 | 1/2003 | Miyahara et al. |
| 2003/0056180 A1* | 3/2003 | Mori .......................... 715/530 |
| 2003/0077097 A1* | 4/2003 | Parry ............................ 400/74 |
| 2003/0133149 A1* | 7/2003 | Takahashi et al. .......... 358/1.15 |
| 2003/0217069 A1* | 11/2003 | Fagin et al. .................. 707/102 |
| 2003/0234948 A1* | 12/2003 | Sasaki ......................... 358/1.13 |
| 2003/0234957 A1* | 12/2003 | Ohara .......................... 358/1.15 |
| 2004/0012816 A1 | 1/2004 | Minowa |
| 2004/0021708 A1* | 2/2004 | Lay et al. ......................... 347/5 |
| 2004/0080767 A1* | 4/2004 | Meilstrup et al. ............ 358/1.13 |
| 2004/0130743 A1* | 7/2004 | Nozato ........................ 358/1.14 |
| 2004/0156064 A1* | 8/2004 | Owen et al. .................. 358/1.13 |
| 2004/0190014 A1* | 9/2004 | Ferlitsch ........................ 358/1.5 |
| 2004/0227968 A1* | 11/2004 | Nakamura et al. ........... 358/1.13 |
| 2004/0233472 A1* | 11/2004 | Gassho et al. ............... 358/1.15 |
| 2004/0264367 A1* | 12/2004 | Edwards ....................... 370/229 |
| 2005/0007624 A1* | 1/2005 | Henry .......................... 358/1.15 |
| 2005/0111045 A1* | 5/2005 | Imai ............................. 358/1.18 |
| 2005/0280836 A1* | 12/2005 | Ferlitsch ........................ 358/1.1 |

FOREIGN PATENT DOCUMENTS

| | | |
|---|---|---|
| EP | 1069741 A | 1/2001 |
| JP | 11-048546 A | 2/1999 |
| JP | 2001-312396 A | 11/2001 |
| JP | 2002-149371 | 5/2002 |
| JP | 2003-011441 A | 1/2003 |
| JP | 2003-288327 | 10/2003 |
| JP | 2003-330677 | 11/2003 |
| JP | 2004-118243 | 4/2004 |
| JP | 2004-252784 | 9/2004 |
| JP | 2004-302654 A | 10/2004 |

* cited by examiner

FIG. 2B

| RAM | Component | Ref |
|---|---|---|
| RAM3 | OS | 3a |
| | DATA/PARAMETER | 3b |
| RAM2 | IMAGE DESCRIPTION DATA | 2a |
| | INTERMEDIATE CODE DATA | 2b |
| | BITMAP DATA | 2c |
| | JOB CHASING SETTING INFORMATION | 2d |
| | JOB CHASING CREATION DATA | 2e |
| | JOB CHASING RESULT DATA | 2f |
| | SPOOLER FLAG | 2g |
| | SPOOL FILE MANAGER FLAG | 2h |
| | DESPOOLER FLAG | 2i |
| | UI INFORMATION | 2j |
| | ANOTHER DATA/PARAMETER | 2k |
| | PROGRAM LOAD AREA | 2m |
| 11 EXTERNAL MEMORY | SPOOL FILE | 11a |
| | APPLICATION | 11b |
| | GRAPHIC ENGINE | 11c |
| | PRINTER DRIVER | 11d |
| |   GRAPHICS CONTROL MODULE | 11d1 |
| |   UI CONTROL MODULE | 11d2 |
| |   SPOOLER MODULE | 11d3 |
| |   SPOOL FILE MANAGER MODULE | 11d4 |
| |   DESPOOLER MODULE | 11d5 |
| |   JOB CHASING UI CONTROL MODULE | 11d6 |
| |   JOB CHASING PROCESSING MODULE | 11d7 |
| | SYSTEM SPOOLER | 11e |
| | JOB CHASING MANAGEMENT | 11f |
| | ANOTHER DATA/PROGRAM | 11g |

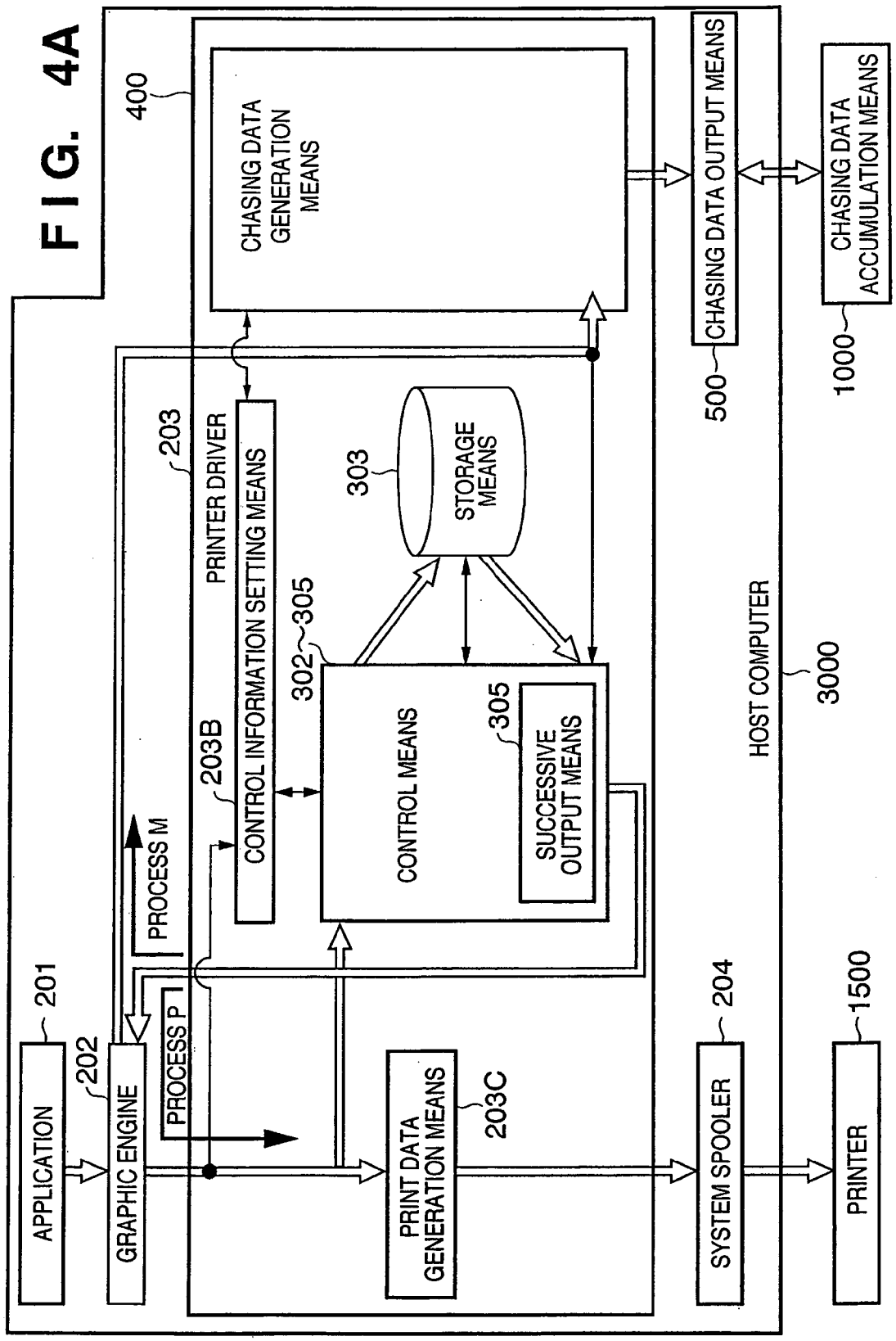

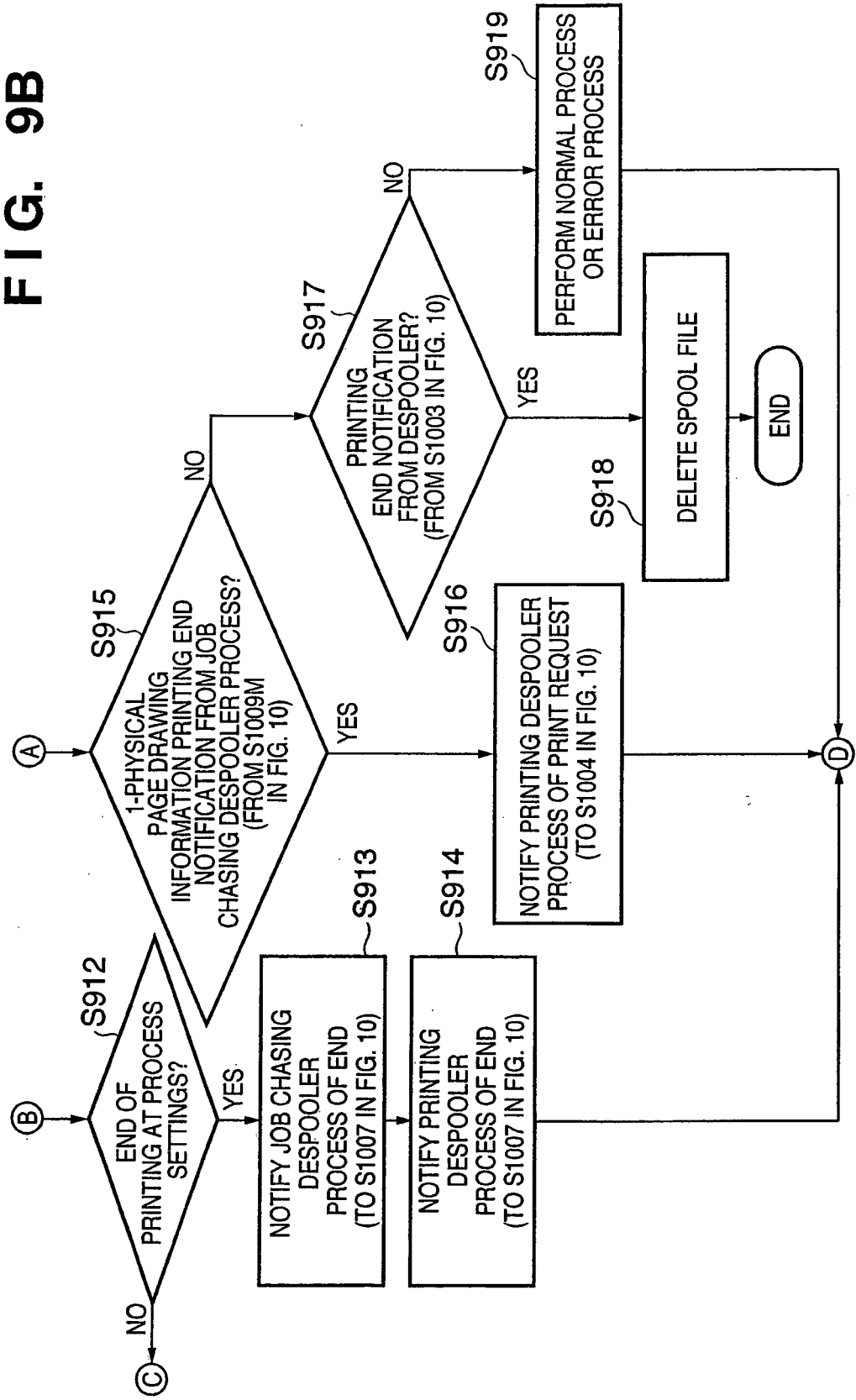

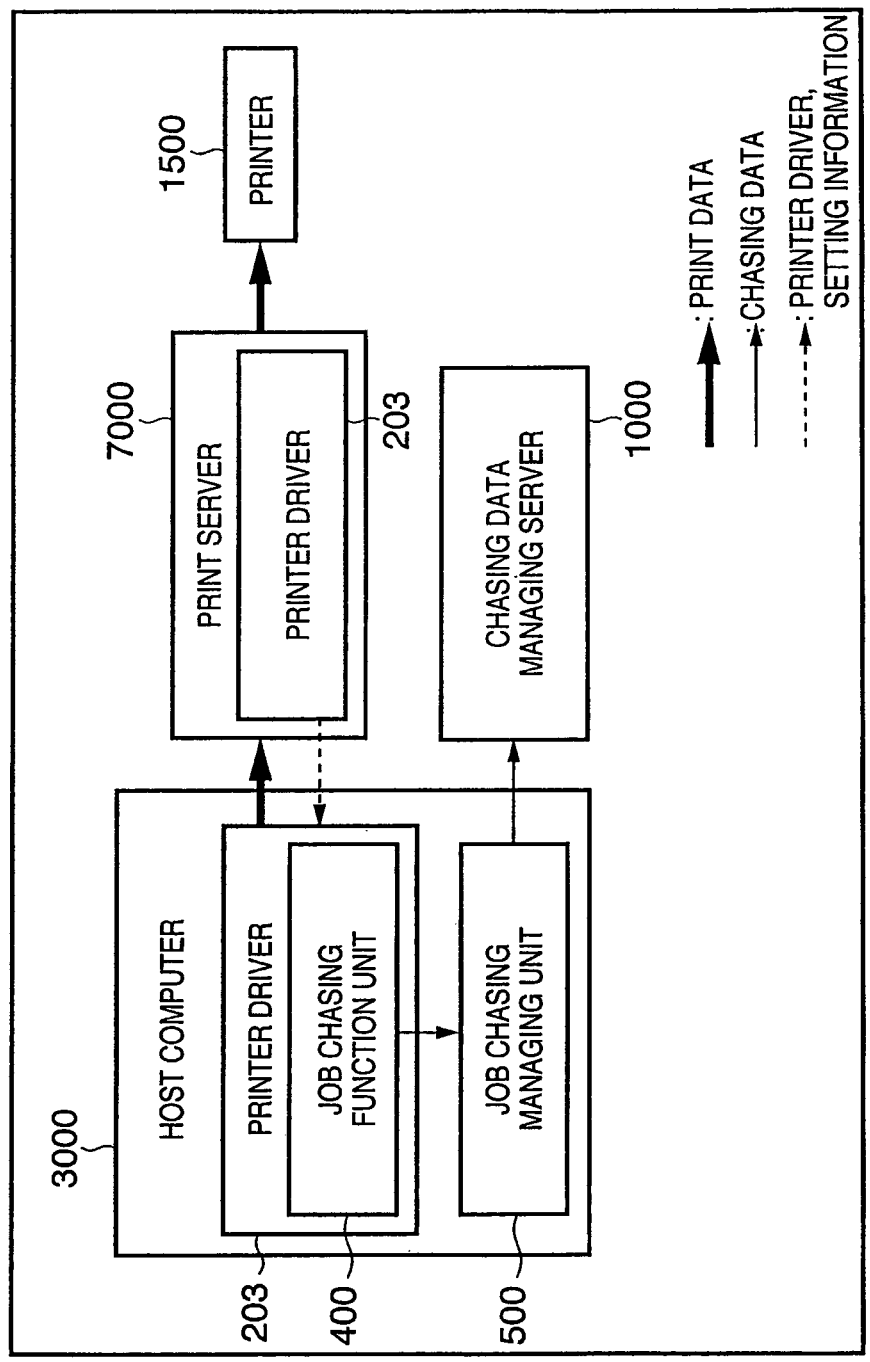

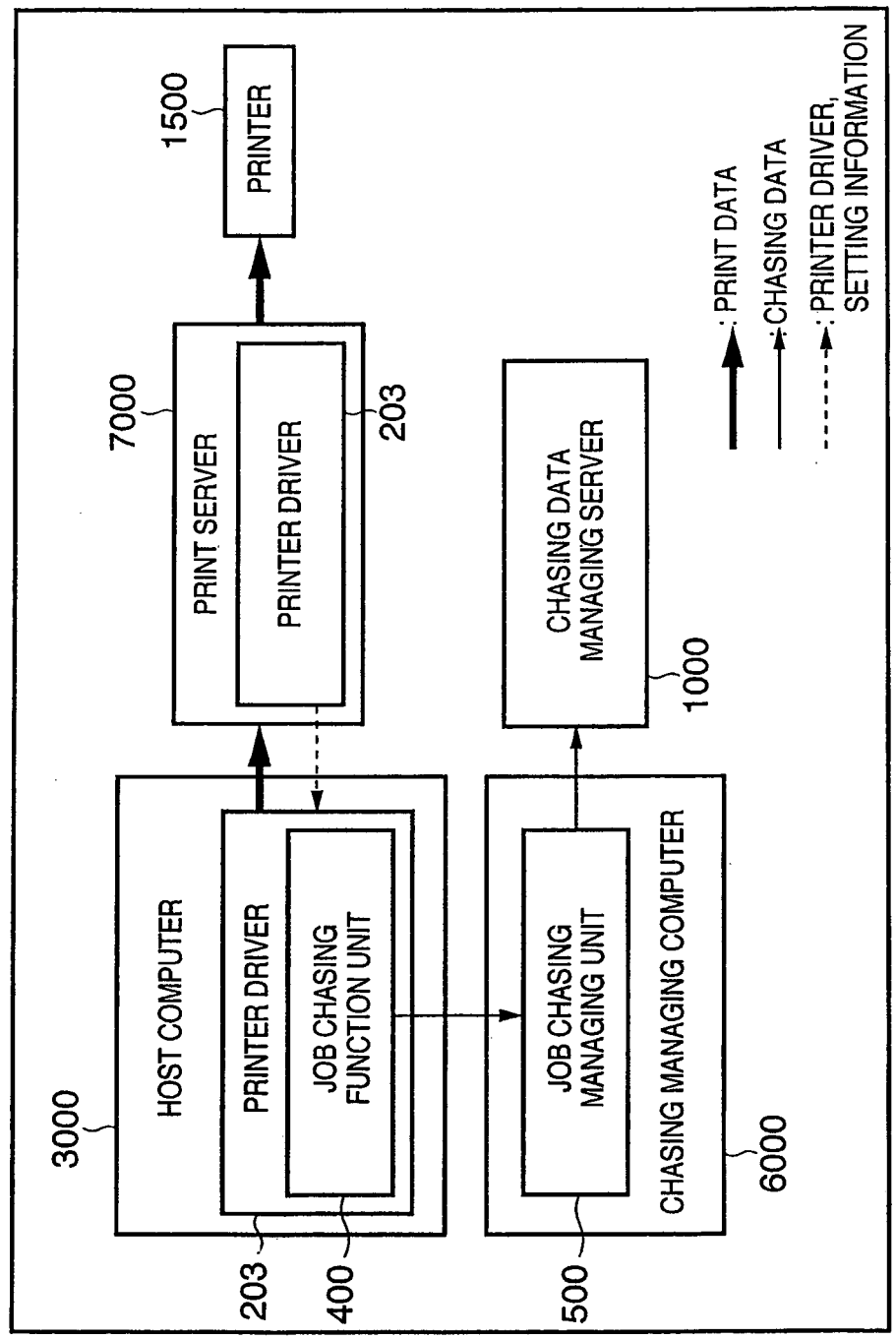

METHOD OF PROTECTING LEAKAGE OF INFORMATION, AND INFORMATION PROCESSING APPARATUS AND DRIVER PROGRAM WHICH IMPLEMENT THE METHOD

FIELD OF THE INVENTION

The present invention relates to a method of protecting leakage of information, and an information processing apparatus and driver program which implement the method and, more particularly, to a method of protecting leakage of information by making it possible to chasing or chase contents printed by a printing apparatus in a system which is built by an information processing apparatus (e.g., a personal computer) and a printing apparatus (e.g., a printer), and an information processing apparatus and printer driver program which implement the method.

BACKGROUND OF THE INVENTION

These days, leakage cases of confidential information such as customer information of a company occur frequently. Once an information leakage case is made public, a company which has leaked information loses reliability, and is often forced to pay a great expense for compensation and measures. Especially, recent information leakage cases become larger in scale than conventional ones, and the managing side of information must take more proper measures against information leakage. As background factors, a large amount of information can be accessed at once and the portability of information abruptly improves as digitization, networking, and mobility of information advance. These trends will be accelerated in the future.

As a conventional method which has widely been adopted as an information leakage measure, there is proposed a method of setting an access right to confidential information or a storing server which stores it, and limiting users who can access the confidential information. However, most of recent information leakage cases are intentional inside jobs by persons on the side who are permitted to access confidential information. The effect of setting the access right to protect information from leakage is not a sufficient information leakage measure.

It should be taken into consideration that information to be protected from leakage includes not only an enormous amount of information typified by customer information of an enterprise, but also information which is small in amount but important in content. Such information can be easily brought out as a printed product, and demands have arisen for a measure which covers leakage of even printed information.

Particularly for a network printing system, a means for protecting leakage of information has been devised so that printed contents are stored to chasing data.

Various means for protecting leakage of information have been proposed.

For example, (1) printing permission information is set for a document to be printed or print data, and referred to in printing (see, e.g., patent reference 1).

(2) User authentication is executed to use a device connected to a network (see, e.g., patent reference 2).

(3) Print data is saved in a reprintable state in a print server. Information such as a job name, client name, and user name is acquired, and a time stamp is added. Further, a bitmap is generated from print data, and saved as a print log (see, e.g., patent reference 3).

(4) In addition to method (3), the printer side also acquires a print log and stores it in a server (see, e.g., patent reference 4).

(5) Simultaneously when a print server receives print data from a client, it also receives information capable of uniquely specifying a user, generates a print log on the basis of the print data and user information, and allows search, browsing, and reprinting (see, e.g., patent reference 5).

[Patent Reference 1] Japanese Patent Laid-Open No. 2004-252784
[Patent Reference 2] Japanese Patent Laid-Open No. 2003-288327
[Patent Reference 3] Japanese Patent Laid-Open No. 2002-149371
[Patent Reference 4] Japanese Patent Laid-Open No. 2003-330677
[Patent Reference 5] Japanese Patent Laid-Open No. 2004-11824-3

According to the conventional method (patent reference 1) of embedding printing permission information and the conventional method (patent reference 2) of performing user authentication, a special application or a network device such as a special printer is necessary. The operation of these methods is applied to limited purposes. That is, in the operation in an office where highly confidential information such as personal information is treated in daily work, an environment where the methods can be applied by introducing a special printing application or a network device such as a special printer is narrowed.

To the contrary, the methods of patent references 3 to 5 are free from these limitations, and do not pose any trouble in the operation in a general office. When these methods are limited to printing via a print server, print content information can be collected, stored, and chased. However, according to the methods of patent references 3 to 5, the printing path is limited to printing via the print server. In other words, these methods are not compatible with a transmission form in which print data is directly transmitted from a client PC to a printing device such as a printer, local port connection, connection by a network protocol, and the like. Because of printing via the print server, the print server must collect and generate print content information in addition to a normal printing process. When a plurality of client PCs nearly simultaneously issue print requests to the printer, the printing performance is expected to decrease. As a matter of course, the print server must be installed, and the installation space must be physically ensured.

In order to accumulate printed contents, chasing data, and implement protection of information from leakage, the following three requirements must be satisfied in accumulating printed contents.

First, printing is done after print contents are reliably saved in the system. This is indispensable for implementing a network printing system with high reliability.

Then, even when print contents are accumulated, the user can quickly get a printed product of the first page of a printed document.

Finally, a difference from an actually printed product is eliminated in accumulating drawing contents. These requirements must be met to implement a network printing system with high accuracy for chasing data.

The conventional problems have been described mainly for the network printing system. These problems are common in protection of information from leakage when confidential information is read out to any medium or output via a medium. These problems are not limited to the network printing system and must be commonly solved in protecting leakage of information.

SUMMARY OF THE INVENTION

The present invention has been made to overcome the conventional drawbacks, and has as its object to provide a method of protecting leakage of information by which the contents of readout or output information can be reliably chased without requiring either a special application or a device having a special function and posing any restriction on the read or output path, and an information processing apparatus and driver program which implement the method.

More specifically, it is an object of the present invention to allow freely determining the operation form such as a form capable of distributing the load even when information is protected from leakage, or a form which does not require any special information processing apparatus. It is another object of the present invention to implement a process sequence of performing an actual process after accumulation of contents is confirmed, in order to read out or output information after information to be accumulated for chasing is reliably saved in a system.

It is still another object of the present invention to allow the user to quickly get the first page of a document even when contents are accumulated. It is still another object of the present invention to eliminate a difference in drawing contents from an actually output product when the drawing contents are accumulated.

By applying the present invention to a network printing system, the operation form such as a form capable of distributing the printing load or a form which does not require another information processing device such as a print server can be freely determined in implementing the network printing system which can accumulate and chasing contents of printed image without requiring either a special printing application or a network device such as a special printer and posing any restriction on the printing path. Moreover, a process sequence of performing an actual printing process after accumulation of contents to be printed is confirmed can be implemented, in order to print information after information to be accumulated is reliably saved in the system.

Even when print contents are accumulated, the user can quickly get a printed product of the first page of a printed document. In addition, a difference in drawing contents from an actually printed product is eliminated in accumulating the drawing contents.

In order to achieve the above objects, according to the present invention, an information processing apparatus which generates a print job subjected to printing by a printing apparatus is characterized by comprising storage means for storing a drawing command output from an application, chasing data generation means for executing a chasing data generation process by using the drawing command read out from the storage means, print data generation means for executing a print data generation process by using the drawing command read out from the storage means, and control means for controlling to successively execute the chasing data generation process by the chasing data generation means and the print data generation process by the print data generation means.

The control means comprises successive output means for successively reading out drawing commands from the storage means, and outputting the drawing commands to the chasing data generation means and the print data generation means. The successive output means repetitively reads out and outputs drawing commands of the same physical page so as to alternately execute, for each physical page, the chasing data generation process by the chasing data generation means and the print data generation process by the print data generation means.

The information processing apparatus further comprises chasing data output means for outputting the chasing data to chasing information accumulation means for accumulating the chasing data so as to be able to manage the chasing data for each print job. The chasing data output means outputs page by page a print content of each page in the drawing command to the chasing information accumulation means. The information processing apparatus further comprises control information setting means for setting control information for controlling generation of the chasing data by the chasing data generation means. The control information setting means sets the control information by using a user interface of a printer driver.

The chasing data generation means executes a process of, when extraction of a text is selected as a chasing setting, extracting a text part from the drawing command read out from the storage means, and when extraction of an image is selected as a chasing setting, generating bitmap data of each page on the basis of the drawing command read out from the storage means. The chasing data generation means executes the chasing data generation process at a bit count which changes between a color page and a monochrome page. The chasing data generation means executes the chasing data generation process by outputting the drawing command read out from the storage means to graphic engine means and causing the graphic engine means to process the drawing command, and the print data generation means executes the print data generation process by outputting the drawing command read out from the storage means to the graphic engine means and causing the graphic engine means to process the drawing command.

According to the present invention, a method of protecting leakage of information in an information processing apparatus which generates a print job subjected to printing by a printing apparatus is characterized by comprising a chasing data generation step of executing a chasing data generation process by using a drawing command read out from storage means for storing a drawing command output from an application, and a print data generation step of executing a print data generation process successively to the chasing data generation process in the chasing data generation step by using the drawing command read out from the storage means.

The chasing data generation process and the print data generation process are successively executed by successively reading out and outputting drawing commands from the storage means. In the successive read/output, drawing commands of the same physical page are repetitively read out and output so as to alternately execute, for each physical page, the chasing data generation process in the chasing data generation step and the print data generation process in the print data generation step.

The method further comprises a chasing data output step of outputting the chasing data to chasing information accumulation means for accumulating the chasing data so as to be able to manage the chasing data for each print job. In the chasing data output step, a print content of each page in the drawing command is output page by page to the chasing information accumulation means. The method further comprises a control information setting step of setting control information for controlling generation of the chasing data in the chasing data generation step. In the control information setting step, the control information is set by using a user interface of a printer driver.

In the chasing data generation step, a process of, when extraction of a text is selected as a chasing setting, extracting a text part from the drawing command read out from the storage means, and when extraction of an image is selected as a chasing setting, generating bitmap data of each page on the basis of the drawing command read out from the storage means is executed. In the chasing data generation step, the chasing data generation process is executed at a bit count which changes between a color page and a monochrome page. In the chasing data generation step, the chasing data generation process is executed by outputting the drawing command read out from the storage means to graphic engine means and causing the graphic engine means to process the drawing command, and in the print data generation step, the print data generation process is executed by outputting the drawing command read out from the storage means to the graphic engine means and causing the graphic engine means to process the drawing command.

There are also provided a driver program which implements the method of protecting leakage of information, and a storage medium which stores the driver program in a computer-readable form.

The present invention can provide a method of protecting leakage of information by which the contents of readout or output information can be reliably chased or chased without requiring either a special application or a device having a special function and posing any restriction on the read or output path, and an information processing apparatus and driver program which implement the method.

More specifically, the present invention allows freely determining the operation form such as a form capable of distributing the load even when information is protected from leakage, or a form which does not require any special information processing apparatus. The present invention can implement a process sequence of performing an actual process after accumulation of contents is confirmed, in order to read out or output information after information to be accumulated for chasing or chasing is reliably saved in a system.

Even when contents are accumulated, the user can quickly get the first page of a document. Further, a difference in drawing contents from an actually output product can be eliminated in accumulating the drawing contents.

When the present invention is applied to a network printing system, the operation form such as a form capable of distributing the printing load or a form which does not require another information processing device such as a print server can be freely determined in implementing the network printing system which can accumulate and chasing contents of printed image without requiring either a special printing application or a network device such as a special printer and posing any restriction on the printing path. Moreover, a process sequence of performing an actual printing process after accumulation of contents to be printed is confirmed can be implemented, in order to print information after information to be accumulated is reliably saved in the system. Even when print contents are accumulated, the user can quickly get a printed product of the first page of a printed document.

By using the same drawing process system as that used for actual printing, a difference in drawing contents from an actually printed product can be eliminated in accumulating the drawing contents. The present invention can also attain a secondary effect of reducing the program size by using the same drawing process system.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2B is a view schematically showing an example of the structure of a memory space in the host computer 3000 according to the embodiment;

FIG. 4A is a block diagram showing, corresponding to elements in claims of the present invention, an example of a configuration for chasing a print job in the host computer 3000 according to the embodiment;

FIGS. 9A and 9B are a flowchart showing an example of a process by a spool file manager 304 according to the first embodiment;

FIG. 16C is a block diagram showing an example of the form of the job chasing function of still another system to which the present invention can be applied;

FIG. 16D is a block diagram showing an example of the form of the job chasing function of still another system to which the present invention can be applied.

DETAILED DESCRIPTION OF THE PREFERRED EMBODIMENTS

Preferred embodiments of the present invention will be described in detail below with reference to the accompanying drawings. The following embodiments will exemplify an application of the present invention to a network printing system. However, as described above, a purpose of the present invention is to solve common problems in protection of information from leakage when confidential information is read out to any medium or output via a medium. The present invention is not limited to the network printing system.

[First Embodiment]
<Example of Configuration of Network Printing System to which Present Invention is Applied>

Figure 1:
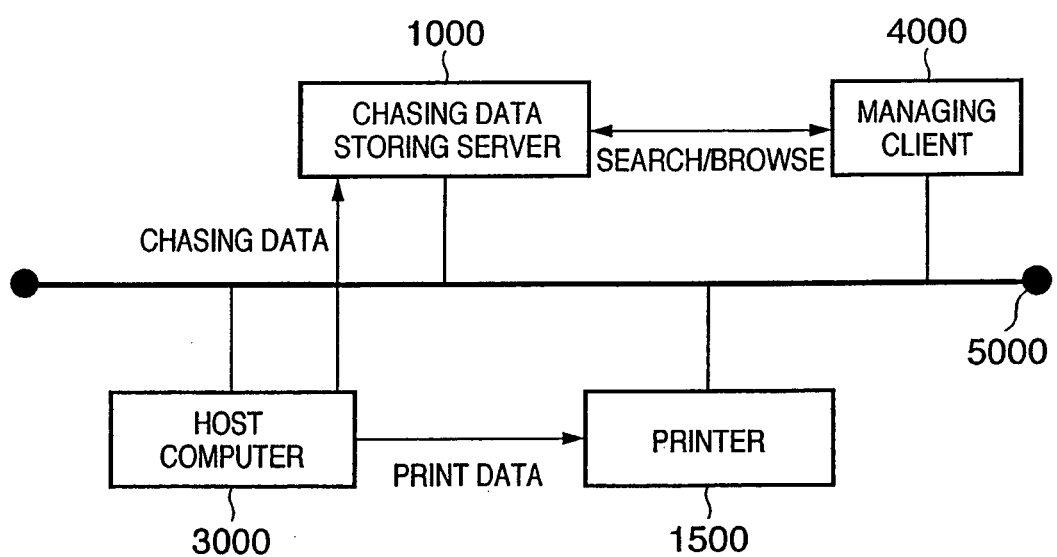
FIG. 1 is a block diagram showing the configuration of a printing system according to an embodiment.

FIG. 1 is a block diagram showing an example of the configuration of a printing system according to the first embodiment of the present invention.

The printing system is built by a host computer 3000 (information processing apparatus of the present invention), printer 1500, chasing data storing server 1000, and managing client 4000 which are connected to a network 5000. The network 5000 may be a wired LAN, public line, or wireless mobile communication.

The host computer 3000 serving as the information processing apparatus of the present invention accepts a print request from the user, generates print data corresponding to the contents of the print request, and transmits the print data to the printer 1500. The host computer 3000 extracts and generates chasing data which meets the print request, and transmits the chasing data to the chasing data storing server 1000. The printer 1500 executes a printing process in accordance with the received print data. The chasing data storing server 1000 registers and saves the chasing data received from the host computer 3000 as a database in a storing area which is ensured in the chasing data storing server 1000 or another information device. The managing client 4000 is used by the system administrator in order to search for and browse the chasing data registered in the database, as needed.

The managing client 4000 may be the same information device as the chasing data storing server 1000.

<Example of Hardware Configuration of Network Printing System According to First Embodiment>

Figure 2A:
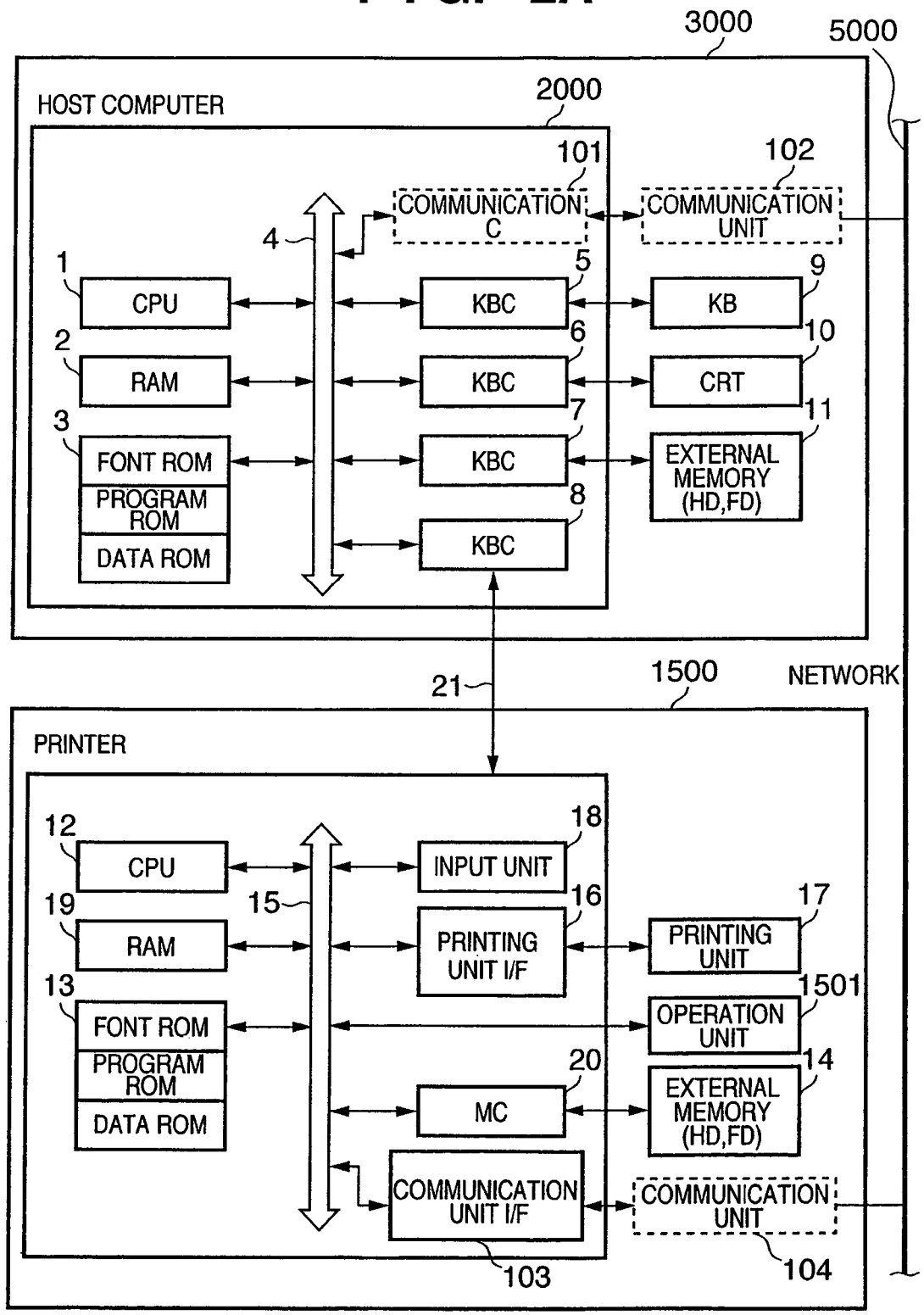
FIG. 2A is a block diagram showing an example of the hardware configurations of a host computer 3000 and printer 1500 according to the embodiment.

FIG. 2A is a block diagram showing an example of the hardware configurations of the host computer 3000 and printer 1500 which construct the network printing system according to the first embodiment. The present invention can be applied to a single device, a system which is formed from a plurality of devices, or a system which is connected to a network (e.g., LAN or WAN) and executes processes as far as the functions of the present invention are executed.

(Host Computer 3000)

In FIG. 2A, the host computer 3000 comprises a CPU 1 for controlling execution of a document process for a document containing a figure, image, text, table (including spreadsheet and the like), and the like, and a printing process based on the document process on the basis of, e.g., a document processing program stored in the program ROM of a ROM 3 or an external memory 11. Processes by the CPU 1 include processes according to the following embodiments of the present invention. The CPU 1 comprehensively controls each device connected to a system bus 4. The program ROM of the ROM 3 or the external memory 11 stores, e.g., an operating system program (to be referred to as an OS hereinafter) serving as the control program of the CPU 1. The font ROM of the ROM 3 or the external memory 11 stores font data and the like used in the document process. The data ROM of the ROM 3 or the external memory 11 stores various data used to perform the document process and the like. A RAM 2 functions as a main memory, work area, and the like for the CPU 1.

A keyboard controller (KBC) 5 controls a key input from a keyboard 9 or a pointing device (not shown). A CRT controller (CRTC) 6 controls display on a CRT display (CRT) 10. Reference numeral 7 denotes a disk controller (DKC) which controls access to the external memory 11 such as a hard disk (HD) or floppy® disk (FD) that stores a boot program, various applications, font data, user files, edit files, a printer control command generation program (to be referred to as a printer driver hereinafter), and the like. A printer controller (PRTC) 8 is connected to the printer 1500 via a bidirectional interface (interface) 21, and executes a communication control process with the printer 1500. A communication controller (communication C) 101 communicates with another apparatus via a communication unit 102 and the network 5000. The printer 1500 may be controlled by the communication controller (communication C) 101 via the network 5000.

Note that the CPU 1 opens various windows registered in advance and executes various data processes on the basis of commands input with the mouse cursor (not shown) or the like on the CRT 10. In executing printing, the user opens a window associated with print settings, and can set the printer and a printing process method to the printer driver including selection of the print mode.

(Example of Storage Structure of Host Computer 3000)

FIG. 2B is a view showing an example of a storage structure including the RAM 2, ROM 3, and external memory 11 in the host computer 3000. FIG. 2B illustrates an image of the storage structure which forms successive address spaces from top to bottom. FIG. 2B corresponds to FIG. 4 showing an example of an expanded system (to be described later). FIG. 2B shows information relevant to characteristic features of the first embodiment, and does not show irrelevant information.

The ROM 3 stores a system program 3a such as an OS or BIOS, and permanent data/parameters 3b. The data/parameters 3b contain fonts and the like.

The RAM 2 includes a temporarily storage data area and program load area.

Figure 5A:
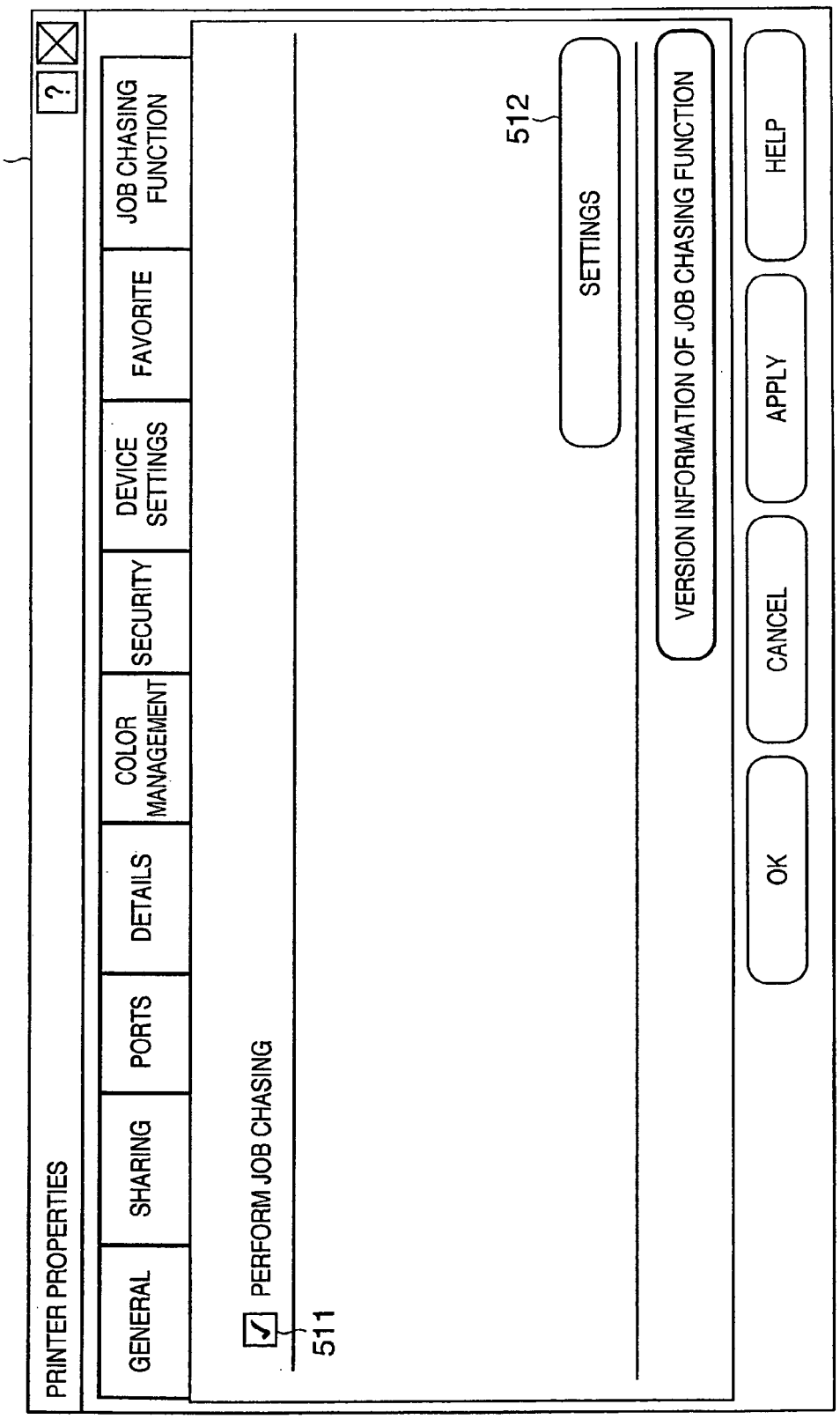
FIG. 5A is a view showing an example of the initial window of a user interface associated with a job chasing function.
Figure 5B:
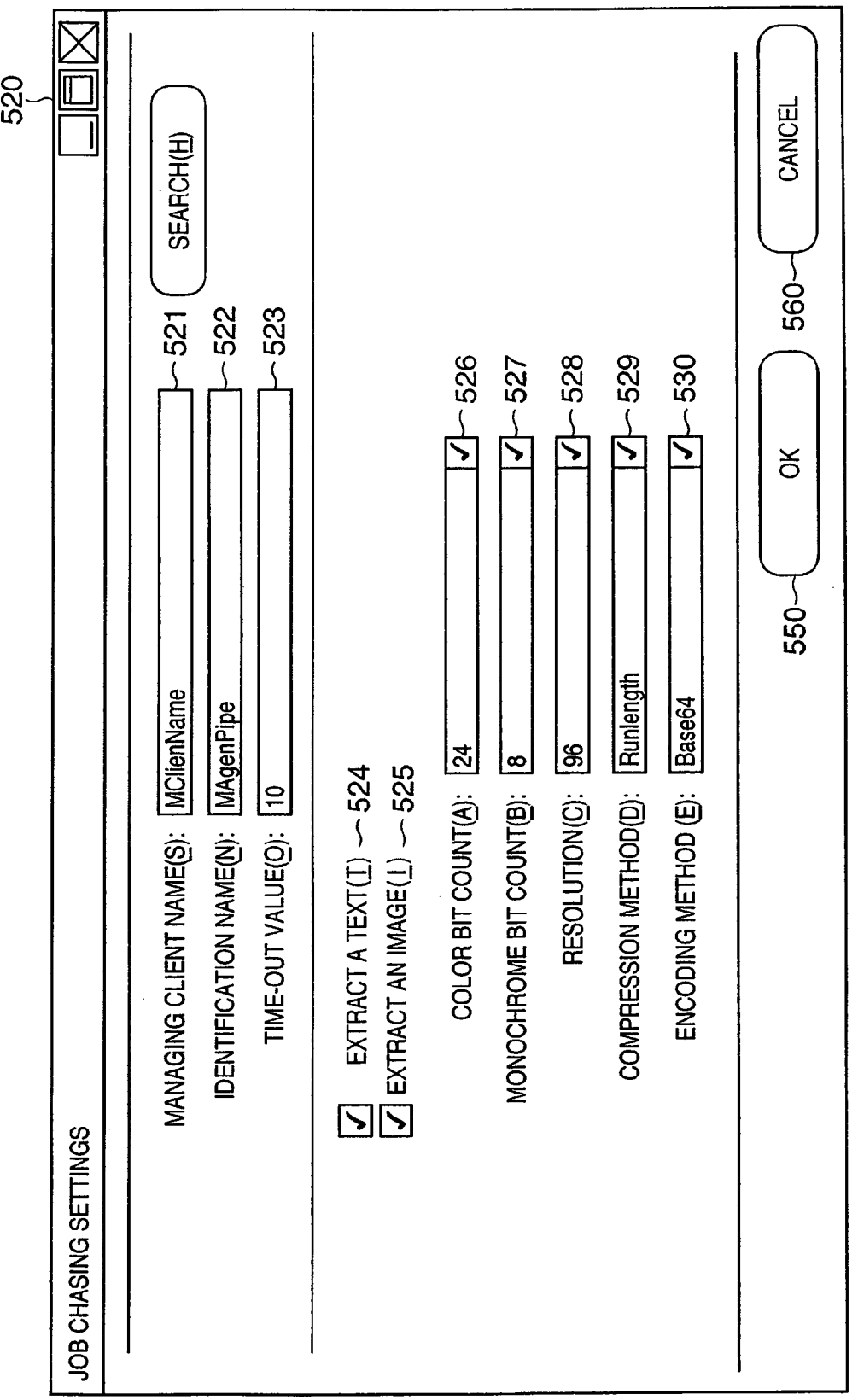
FIG. 5B is a view showing an example of the job chasing setting window of the user interface associated with the job chasing function.

The data area includes an area 2a for image description data which is described in the PDL or the like used in the first embodiment, an area 2b for intermediate code data which is analyzed and created by a graphic engine 202 and spooled to a spool file 303 by a spooler 302, an area 2c for bitmap data which is converted from an intermediate code by the graphic engine 202 via a despooler 305, an area 2d for job chasing setting information serving as the setting contents of save data for job chasing set by a job chasing function UI control unit 401 via a user interface in FIGS. 5A and 5B (to be described later), an area 2e for job chasing creation data which is created by a job chasing function processing unit 402 in accordance with job chasing setting information, transferred to a job chasing managing unit 500, and held in the chasing data storing server 1000, an area 2f for job chasing result data serving as the result of management for protecting leakage of information by the job chasing managing unit 500 on the basis of information held in the chasing data storing server 1000, an area 2g for a spooler flag which is used in a process by the spooler 302 and represents the start/end of a job, a page break, and the like, an area 2h for a spool file manager flag which is used in a process by a spool file manager 304 and represents notifications from the spooler 302 and despooler 305, an area 2i for a despooler flag which is used in a process by the despooler 305 and represents a notification from the spool file manager 304, an end flag, and the like, an area 2j for UI information for a UI control unit 203B of a printer driver 203, and an area 2k for another data/parameter.

Figure 3:
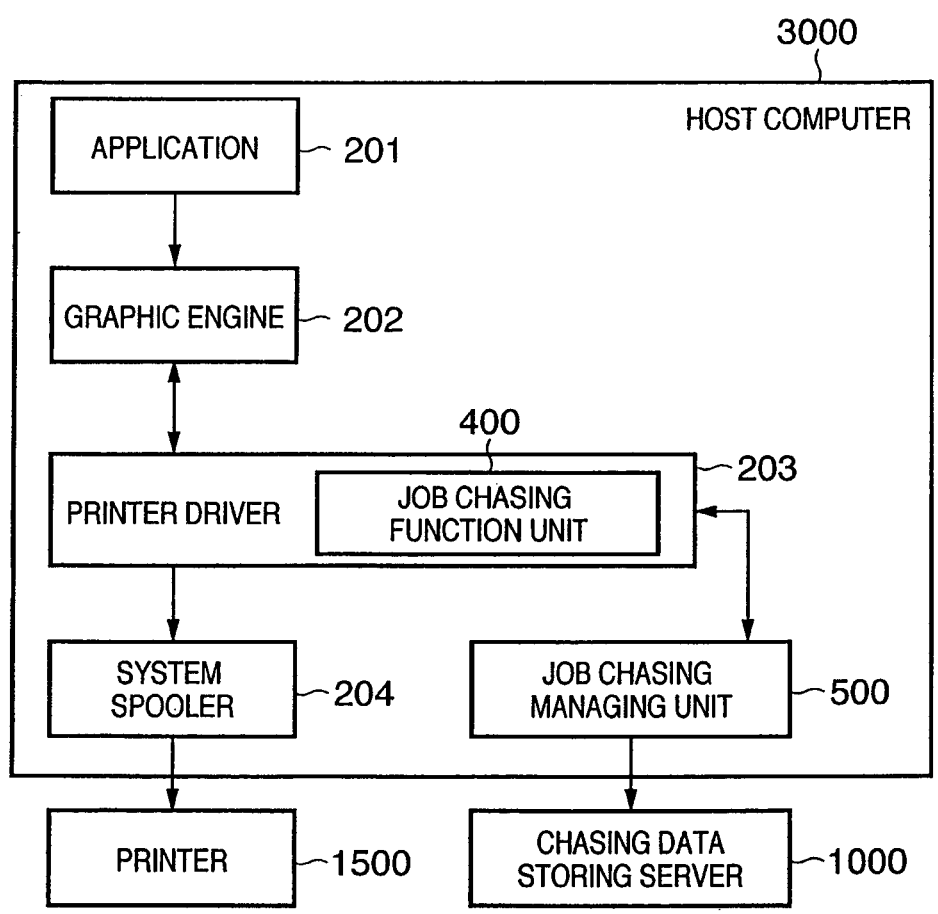
FIG. 3 is a functional block diagram showing an example of a configuration for chasing a print job in the host computer 3000 according to the embodiment.

An application, printer engine, and job chasing managing program are loaded from the external memory 11 into a program load area 2m, and executed by the CPU 1 to implement the processes of blocks in FIGS. 3 and 4.

The external memory 11 subsequent to the RAM 2 includes a data area for saving a database and file, and a program area for storing an application, printer engine, and job chasing managing program according to the first embodiment.

The data area has a spool file area 11a for holding intermediate data spooled by the spooler 302.

The program area includes an application area 11b for storing an application 201, a graphic engine area 11c for storing the graphic engine 202, a printer driver area 11d for storing the printer driver 203, a system spooler area 11e for storing a system spooler 204, and a job chasing managing area 11f for storing a program which implements the job chasing managing unit 500.

The printer driver area 11d serving as the main part of the first embodiment includes a graphics control module 11d1 for implementing a graphics control unit 203A, a UI control module 11d2 for implementing the UI control unit 203B, a spooler module 11d3 for implementing the spooler 302, a spool file manager module 11d4 for implementing the spool file manager 304, a despooler module 11d5 for implementing the despooler 305, a job chasing function UI control module 11d6 for implementing the job chasing function UI control unit 401, and a job chasing function processing module 11d7 for implementing the job chasing function processing unit 402.

Further, the external memory 11 has another data/program area 11g which is not a characteristic feature of the first embodiment.

(Printer 1500)

In FIG. 2A, the printer 1500 is controlled by a CPU 12. The printer CPU 12 outputs an image signal serving as printout information to a printing unit (printer engine) 17 connected to a system bus 15 on the basis of, e.g., a control program stored in a ROM 13 or a control program stored in an external memory 14. The program ROM of the ROM 13 stores a control program for the printer CPU 12, and the like. The font ROM of the ROM 13 stores, e.g., font data used to generate the printout information. The data ROM of the ROM 13 stores, e.g., information used in a computer when the printer does not have any external memory 14 such as a hard disk.

The CPU 12 can communicate with the computer via an input unit 18. With this configuration, the CPU 12 can notify the computer 3000 of internal information of the printer and the like. A RAM 19 functions as a main memory, work area, and the like for the CPU 12. The RAM 19 is so constructed as to increase the memory capacity by an optional RAM which is connected to an expansion port (not shown). The RAM 19 is used as an output information mapping area, environment data storing area, NVRAM, and the like.

Access to the external memory 14 such as a hard disk (HD) or IC card is controlled by a memory controller (MC) 20. The external memory 14 is connected as an option, and stores font data, an emulation program, form data, and the like. The input unit 18 includes a switch, LED display, and the like for operation on the operation panel. A communication controller (communication C) 103 communicates with another apparatus via a communication unit 104 and the network 5000. The printer 1500 may be controlled by the host computer 3000 via the communication controller (communication C) 103 and network 5000.

The printer 1500 may have an NVRAM (not shown) and store printer mode setting information from an operation panel 1501.

The printing unit 17 is an electrophotographic engine in the first embodiment. Print data is finally printed on a medium such as paper by toner dots. Note that the printing method of the present invention is not limited to the electrophotographic method. For example, the present invention can also be applied to a printing apparatus of any type (e.g., inkjet type) which prints by forming dots.

<Example of Functional Blocks of Processes in Host Computer>

An example of the configurations of a printing process function and information chasing function in the host computer 3000 will explained with reference to FIGS. 3 and 4A and 4B.

(Example of Basic Configuration of Functional Blocks)

FIG. 3 is a block diagram showing an example of a basic configuration for the printing process and the generation process of chasing data in the computer 3000 shown in FIG. 1.

The application 201, the graphic engine 202 serving as the drawing part of an operating system (to be referred to as an OS hereinafter) (e.g., corresponding to a GDI (Graphic Device Interface) module for Windows® OS available from Microsoft), the printer driver 203, and the system spooler 204 exist as files saved in the external memory 11. These files are program modules which are loaded into the RAM 2 and executed by the OS or a module that uses the module.

The application 201 and printer driver 203 can be added to the FD of the external memory 11, a CD-ROM (not shown), or the HD of the external memory 11 via a network (not shown). The application 201 saved in the external memory 11 is loaded into the RAM 2 and executed. When the application 201 instructs the printer 1500 to print, the graphic engine 202 which is also loaded into the RAM 2 and becomes ready is used to output (draw) an image.

The graphic engine 202 loads, from the external memory 11 to the RAM 2, the printer driver 203 which is prepared for each printing apparatus such as a printer. The graphic engine 202 sets an output from the application 201 in the printer driver 203. The graphic engine 202 converts a GDI (Graphic Device Interface) function received from the application 201 into a DDI (Device Driver Interface) function, and outputs the DDI function to the printer driver 203.

Based on the DDI function received from the graphic engine 202, the printer driver 203 converts data into a control command, e.g., PDL (Page Description Language) which can be recognized by the printer. The converted printer control command passes through the system spooler 204 which is loaded into the RAM 2 by the OS, and then the command is output as print data to the printer 1500 via the interface 21.

The printing system according to the first embodiment has a job chasing function unit 400 in the printer driver 203. The job chasing function unit 400 may be a built-in module of the printer driver 203, or a library module which is added by individual installation. The printer driver 203 extracts and generates chasing data by executing the job chasing function unit 400, and transmits the chasing data to the job chasing managing unit 500.

The job chasing managing unit 500 receives the chasing data, and transfers it to the chasing data storing server 1000.

If necessary, the job chasing managing unit 500 may process or screen received chasing data. Further, simultaneously when the job chasing managing unit 500 receives chasing data, it may transmit the chasing data to the chasing data storing server 1000, or temporarily store the chasing data in a storing area such as a hard disk and transmit it to the chasing data storing server 1000 in accordance with a separately designated transmission schedule to the chasing data storing server 1000.

(Example of Configuration of Blocks shown as Elements of Claims)

Figure 4B:
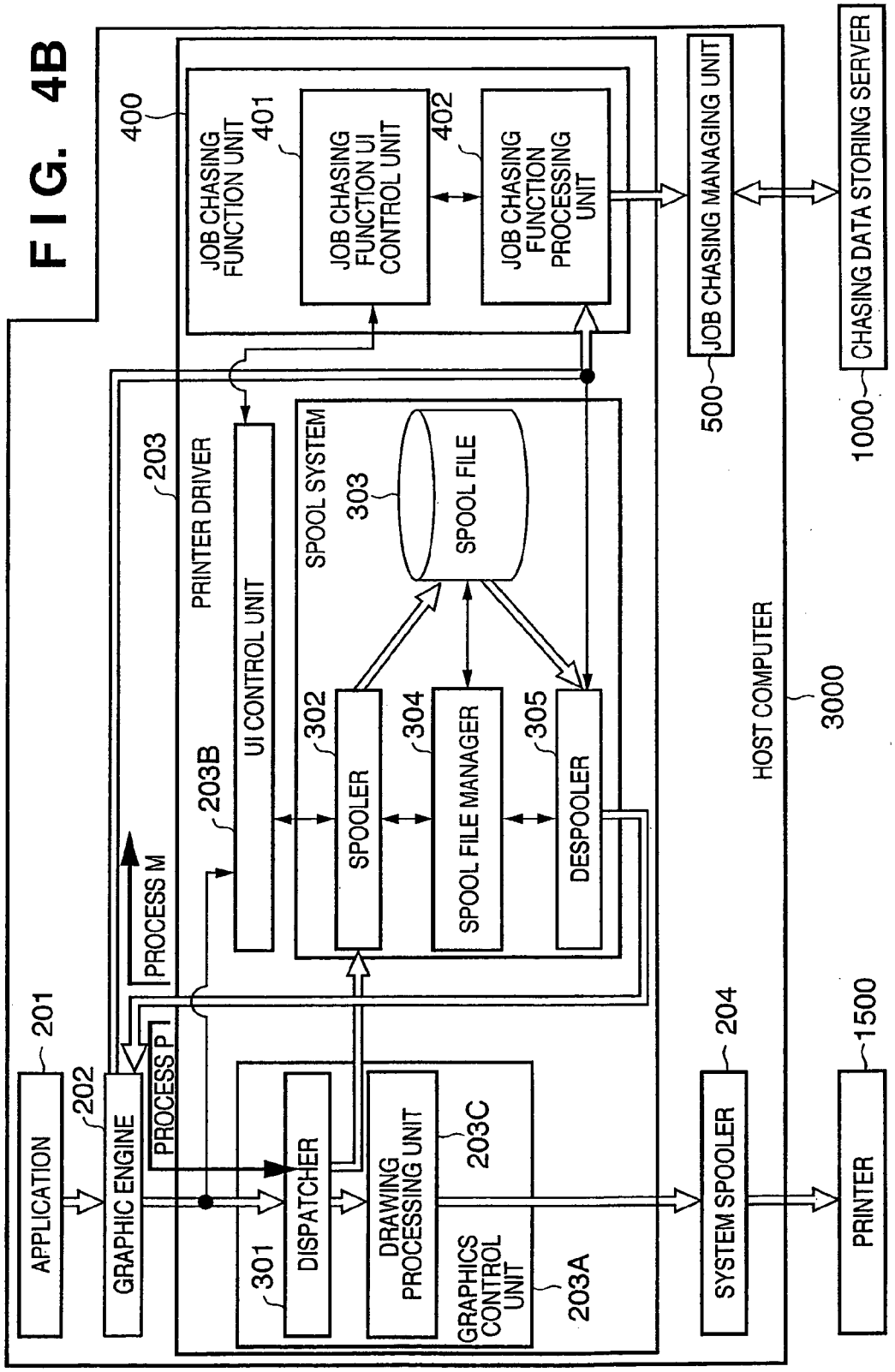
FIG. 4B is a functional block diagram showing an example of an expanded configuration for chasing a print job in the host computer 3000 according to the embodiment.

FIG. 4A shows elements of claims corresponding to the functional blocks in FIG. 4B as shown thereinafter.

In FIG. 4A, elements referred by the same number as those in FIG. 4B perform the same function. The functions of elements in FIG. 4A are not mentioned here since those are described clearly in claims and the description of FIG. 4B thereinafter.

(Example of Expanded Configuration of Functional Blocks)

FIG. 4B shows a system which is expanded from the system shown in FIG. 3. When a print command is sent from the graphic engine 202 to the printer driver 203, a spool system 300 temporarily generates the spool file 303 which is formed from intermediate codes. In FIG. 4B, transfer of print data is represented by a double line, and connection of control information is represented by a single line in order to make the following operation clear.

In the system of FIG. 3, the application 201 is released from a printing process after the printer driver 203 converts all print commands from the graphic engine 202 into printer control commands. To the contrary, in the system of FIG. 4B, the application 201 is released after the spooler 302 converts all print commands into intermediate code data and outputs them to the spool file 303. In general, the latter process is completed in a shorter time. In the system shown in FIG. 4B, the contents of the spool file 303 can be processed. This system can implement functions which are not provided to the application, for example, a function of enlarging/reducing print data from the application, or a function of reducing a plurality of pages into one page and printing.

For this purpose, the system in FIG. 3 is so expanded as to spool print commands as intermediate code data, as shown in FIG. 4B. In order to process print data, setting is generally made from the UI control unit 203B provided by the printer driver 203, and the setting contents are saved in the RAM 2 or external memory 11.

Details of the system in FIG. 4B will be explained. Process M in FIG. 4B represents a despooler process for the job chasing function, and process P represents a despooler process for a printing process.

According to the expanded process method, as shown in FIG. 4B, a dispatcher 301 receives a DDI function serving as a print command from the graphic engine 202. When the print command (DDI function) received by the dispatcher 301 from the graphic engine 202 is based on a print command (GDI function) issued from the application 201 to the graphic engine 202, the dispatcher 301 loads the spooler 302 stored in the external memory 11 to the RAM 2, and transmits the print command (DDI function) to the spooler 302.

The spooler 302 analyzes the received print command, converts it into an intermediate code for each page, and outputs the intermediate code to the spool file 303. The spooler 302 acquires print data process settings (Nup, double-sided printing, staple, color/monochrome designation, and the like) which are made from the UI control unit 203B, and saves the settings as a file of each job in the spool file 303. The spool file 303 is generated as a file in the external memory 11, but may be generated in the RAM 2. The spooler 302 loads, into the RAM 2, the spool file manager 304 stored in the external memory 11, and notifies the spool file manager 304 of the generation status of the spool file 303.

The spool file manager 304 determines whether printing is possible in accordance with the contents of the print data process settings saved in the spool file 303. When the spool file manager 304 determines that printing is possible using the graphic engine 202, it loads, into the RAM 2, the despooler 305 stored in the external memory 11, and instructs the despooler 305 to perform a printing process for a page drawing file of an intermediate code that is described in the spool file 303.

In accordance with a job setting file which is contained in the spool file 303 and contains the process setting information, the despooler 305 processes the page drawing file of the intermediate code that is contained in the spool file 303. More specifically, the despooler 305 reads a page drawing command of an intermediate code, generates a GDI function again, and outputs it via the graphic engine 202.

In order to transmit a drawing result based on the output GDI function to the job chasing function processing unit, the despooler 305 ensures a bitmapping area (device context) in the RAM 2, and draws an image. Generated chasing information is converted by the job chasing function processing unit 402 into a format readable by the job chasing managing unit 500, and then transmitted. The conversion format may be a highly compatible format such as the XML format, or a format complying with a unique rule.

The despooler 305 outputs the GDI function to the dispatcher 301 via the graphic engine 202.

When the print command (DDI function) received from the graphic engine 202 is based on the print command (GDI function) which has been issued from the despooler 305 to the graphic engine 202, the dispatcher 301 transmits the print command not to the spooler 302 but to a drawing processing unit 203C.

The drawing processing unit 203C generates a printer control command in the page description language (PDL) or the like on the basis of the DDI function acquired from the graphic engine 202, and outputs the printer control command to the printer 1500 via the system spooler 204.

In addition to the above-described module configuration, the printer driver 203 has the job chasing function UI control unit 401 and job chasing function processing unit 402 as the job chasing function unit 400 which is a characteristic configuration of the present invention. Operation of the job chasing function unit 400 will be explained with reference to FIGS. 5A and 5B and subsequent drawings.

The configurations of the printing process apparatus and information chasing apparatus in the host computer 3000 have been described.

<Description of Example of Job Chasing Function UI>

FIGS. 5A and 5B are views showing examples of a user interface (to be referred to as a UI hereinafter) for setting job chasing.

FIG. 5A shows an example of the initial window of a user interface that is displayed by the job chasing function UI control unit 401 in the job chasing function unit 400. In the first embodiment, settings can be made in a property sheet "job chasing function" in the dialog of a printer driver UI.

Job chasing setting windows shown in FIGS. 5A and 5B may be displayed on a dedicated tool different from that for the printer driver 203, and setting information may be transmitted to the add-in UI control unit 401 in the printer driver 203. In terms of the operation purpose of the system, a dialog 510 is desirably displayed to only a user who is permitted to change settings of the printer. Authentication based on a password or the like may be adopted to open the dialog, or the execution user authority may be limited.

A "perform job chasing" check box 511 in FIG. 5A designates whether to validate or invalidate the job chasing function. The user can operate the check box to ON/OFF-control the function.

A dialog 520 in FIG. 5B for making detailed settings of the job chasing function is opened by selecting a setting button 512 in FIG. 5A. In the job chasing setting dialog, information on a chasing data transmitting side and the contents of chasing data generated by the job chasing function processing unit 402 are mainly determined.

In a managing client name field 521, the identification name of a computer in which the job chasing managing unit 500 runs is input. In an identification name field 522, a key for discrimination from another connection in the job chasing managing unit 500 is input. In a time-out value field 523, a time-out value used in communication with the job chasing managing unit 500 is set in advance. These three pieces of information are used to transmit chasing data.

If the job chasing managing unit 500 runs in a computer which displays the user interface, the identification name of the computer is set in the managing client name field 521. If the job chasing managing unit 500 runs in anther computer, the identification name of the computer in which the job chasing managing unit 500 is input.

An "extract a text" check box 524 designates whether to contain text character string information in chasing data. By checking the check box, the printer driver 203 extracts text character string information as chasing data. When the text character string information is added to chasing data, the text stored in the chasing data storing server 1000 can be easily searched for.

An "extract an image" check box 525 designates whether to contain bitmap information in chasing data. By checking the check box, the printer driver 203 generates a page bitmap separately from print data by using the graphic engine 202. When the page bitmap is added to chasing data, the image stored in the chasing data storing server 1000 can be browsed.

A color bit count field 526 is an item for setting the bit count per pixel when the chasing bitmap of a target page is held as color bitmap data in order to print the target page as a color page. In the example of FIG. 5B, one pixel is formed from 24 bits for each of R, G, and B (16,770,000 colors at 256 levels for each of R, G, and B).

A monochrome bit count field 527 is an item for setting the bit count per pixel when the chasing bitmap of a target page is held as monochrome bitmap data in order to print the target page as a monochrome page. In the example of FIG. 5B, one pixel is formed from 8 bits (256 levels).

A resolution field 528 is an item for setting the resolution of a chasing bitmap. In the example of FIG. 5B, an image is created at a resolution of 96 DPI. A compression method field 529 is an item for selecting the compression method of a chasing bitmap. In the example of FIG. 5B, the run-length compression method is used.

An encoding method field 530 is an item for setting an encoding method used to transmit chasing data (prepared by compressing a text or bitmap) from the host computer 3000 to the chasing data storing server 1000. In the example of FIG. 5B, "Base64" is used.

By using the user interface having these setting items, the attribute and form of the page image of chasing data to be generated can be designated in detail.

Note that the job chasing function UI is merely an example, and the present invention is not limited to this. Information set on the job chasing function UI is stored in the job chasing setting information area 2d in FIG. 2B, and referred to by the job chasing function unit 400 in creating chasing data.

<Example of Operation of Job Chasing Process According to First Embodiment>

An example of operation of a job chasing process in the network printing system according to the first embodiment will be explained.

(Example of Job Chasing Printing Process)

Figure 6:
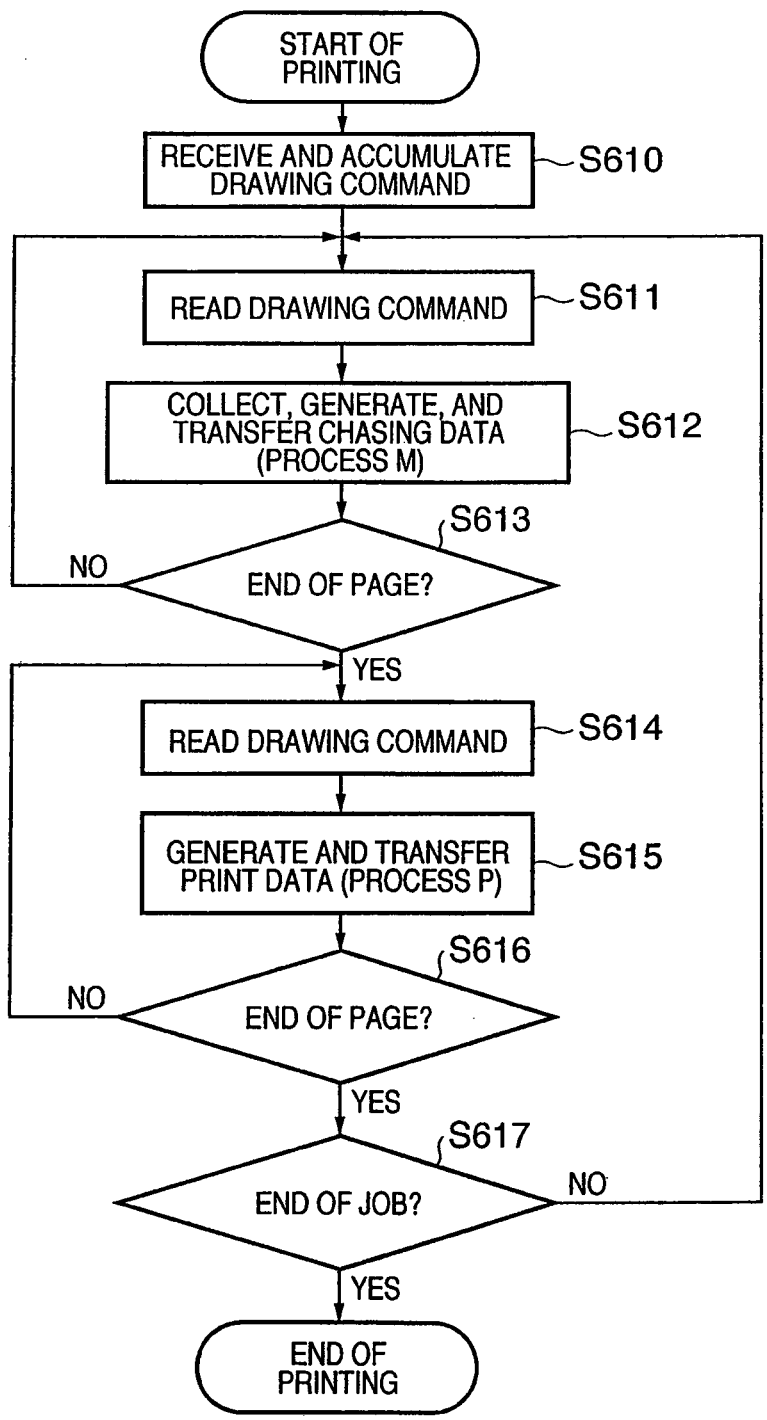
FIG. 6 is a flowchart showing the outline of the overall process of job chasing according to the embodiment.

FIG. 6 is a flowchart for explaining the flow of the overall process of job chasing printing described with reference to FIG. 4B.

After a printing process starts from an application, the spool system 300 in the printer driver 203 transmits a drawing command (DDI function in the first embodiment) from the graphic engine 202 to the spooler 302 via the dispatcher 301, and accumulates the drawing command as the spool file 303 of each page in step S610. In the first embodiment, data accumulated in the spool file 303 takes the format of intermediate code data converted from the drawing command, but the drawing command may be directly stored. Hence, data accumulated in the spool file 303 is expressed as a drawing command. In step S611, the spool system 300 reads the drawing command from the spool file 303.

In step S612, when a setting of performing job chasing has been made from the job chasing function UI control unit 401, as described with reference to FIGS. 5A and 5B, the despooler 305 in the spool system collects job chasing information on the basis of an instruction from the spool file manager 304. The despooler 305 generates setting information for the graphic engine 202, sets the generated setting information for the graphic engine 202, and outputs a drawing command read out from the spool file 303. Based on the setting information, the graphic engine 202 transfers data to the job chasing managing unit 500 via the job chasing function processing unit 402 in the job chasing function unit 400 (this corresponds to process M).

More specifically, for example, if it is set to perform job chasing, and the drawing command is a printing start command, the despooler 305 defines attribute information on the job, environment information for printing, or the like as chasing data. If the drawing command is a page start command, the despooler 305 defines attribute information on the page or the like as chasing data. If the job chasing function UI control unit 401 is instructed to extract text information, the despooler 305 extracts character string information or the like from a text drawing command, and defines it as chasing data. If the job chasing function UI control unit 401 is instructed to extract an image, the despooler 305 draws a bitmap image corresponding to each drawing command in an ensured memory area or the like. In this manner, the despooler 305 executes processes depending on a drawing command and various settings which are designated to the job chasing function unit 400, collects and generates chasing data, and transfers the chasing data to the job chasing managing unit 500.

In a process of generating not chasing data but a print job to be output to the printer, the despooler 305 outputs to the graphic engine 202 a print job prepared by CreateDC( ) from DEVMODE (print setting structure) created on the basis of print settings from the printer driver UI (UI control unit 203B) in spool. If extraction of an image is designated, i.e., in a process of generating a chasing bitmap among chasing data, the despooler 305 generates, from information set via the job chasing function UI control unit 401 in FIG. 5B, setting information which is to be set for the graphic engine 202.

As concrete procedures, the despooler 305 generates CreateCompatibleDC( ), and issues CreateDIBSection( ) to request the graphic engine 202 to create a bitmap from a drawing command on the basis of values set in the color bit count field 526, monochrome bit count field 527, and resolution field 528. The despooler 305 makes the generated bitmap correspond to CreateCompatibleDC( ) by SelectObject( ). In order to output the bitmap generated by the graphic engine 202 to the job chasing function processing unit 402, the despooler 305 notifies the job chasing function processing unit 402 of the pointer of the bitmap generated by the graphic engine 202.

In general, CreateDC( ) is used to output a drawing command having undergone drawing by the graphic engine 202 to the printer object (printer driver) of an output destination. CreateCompatibleDC( ) is a function used to write bitmap data in an ensured memory.

In step S613, it is determined whether job chasing information generation and transfer processes on one physical page have ended. If the processes have not ended, the flow returns to step S611.

If a drawing process for one physical page has ended in step S613, the flow advances to step S614, and the despooler 305 reads again from the spool file 303 a drawing command of a page for which chasing data has been generated. In step S615, the despooler 305 generates print data (converts data into a GDI function) on the basis of an instruction from the spool file manager 304, and outputs the print data to the graphic engine 202. The dispatcher 301 receives a drawing command (printing DDI function) converted by the graphic engine 202, and the drawing processing unit 203C generates print data in the page description language. The print data is written in the system spooler 204, and transferred to the printer 1500 (this corresponds to process P).

In step S616, it is determined whether the printing process for one physical page has ended. If the printing process has not ended, the flow returns to step S611; if the printing process has ended, advances to step S617.

If it is determined in step S617 that the print job has ended, the process ends. If it is determined that no print job has ended, the flow returns to step S611 to continue the process for the job.

In the flowchart of FIG. 6, one page of print data is generated after one page of chasing data is generated. However, the present invention is not limited to this order, and one page of chasing data may be generated after one page of print data is generated. The former procedure guarantees chasing by always printing print data after its chasing data is generated. The latter procedure provides an effect of quickly starting a printing process for the first page. In either case, chasing data and print data are desirably alternately generated for each page.

(Example of Processes by Spool System 300)

Processes by the spool system 300 in the job chasing printing process shown in FIG. 6 will be explained with reference to FIGS. 7 to 10.

Figure 7:
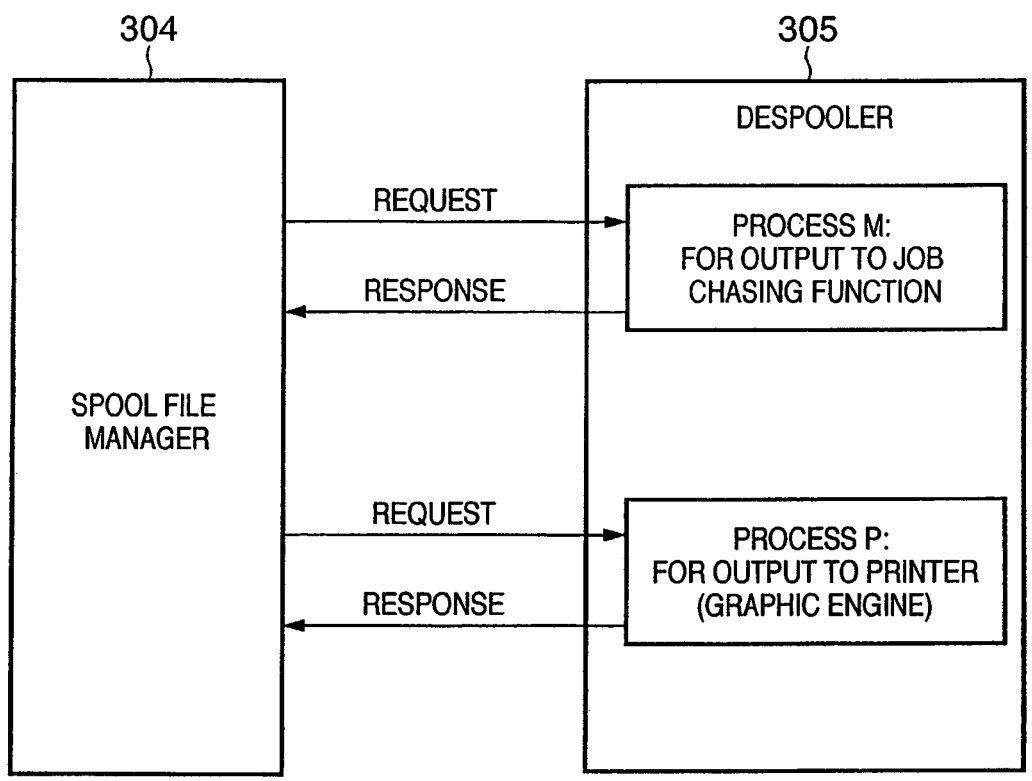
FIG. 7 is a functional block diagram showing an example of a process by a despooler 305.

As described above, the despooler 305 outputs data to two output destinations, i.e., the job chasing function unit 400 and dispatcher 301. In the first embodiment, as shown in FIG. 7, two processes M and P for the despooler 305 are generated, and the spool file manager 304 controls these two despooler processes M and P. The first process M is used for output to the job chasing function unit, and the second process P is used for printing by the printer 1500. The two despool processes M and P are generated by the spool file manager 304.

Processes in the spool system 300 will be described in detail with reference to FIGS. 8 to 10. The relationships between processes are represented by steps. As a characteristic feature of the first embodiment, the two processes M and P by the despooler 305 are identical, and their common flowchart is shown in FIG. 10. "M"s are suffixed to steps of the process M, and "P"s are suffixed to those of the process P.

(Example of Process by Spooler 302)

Figure 8:
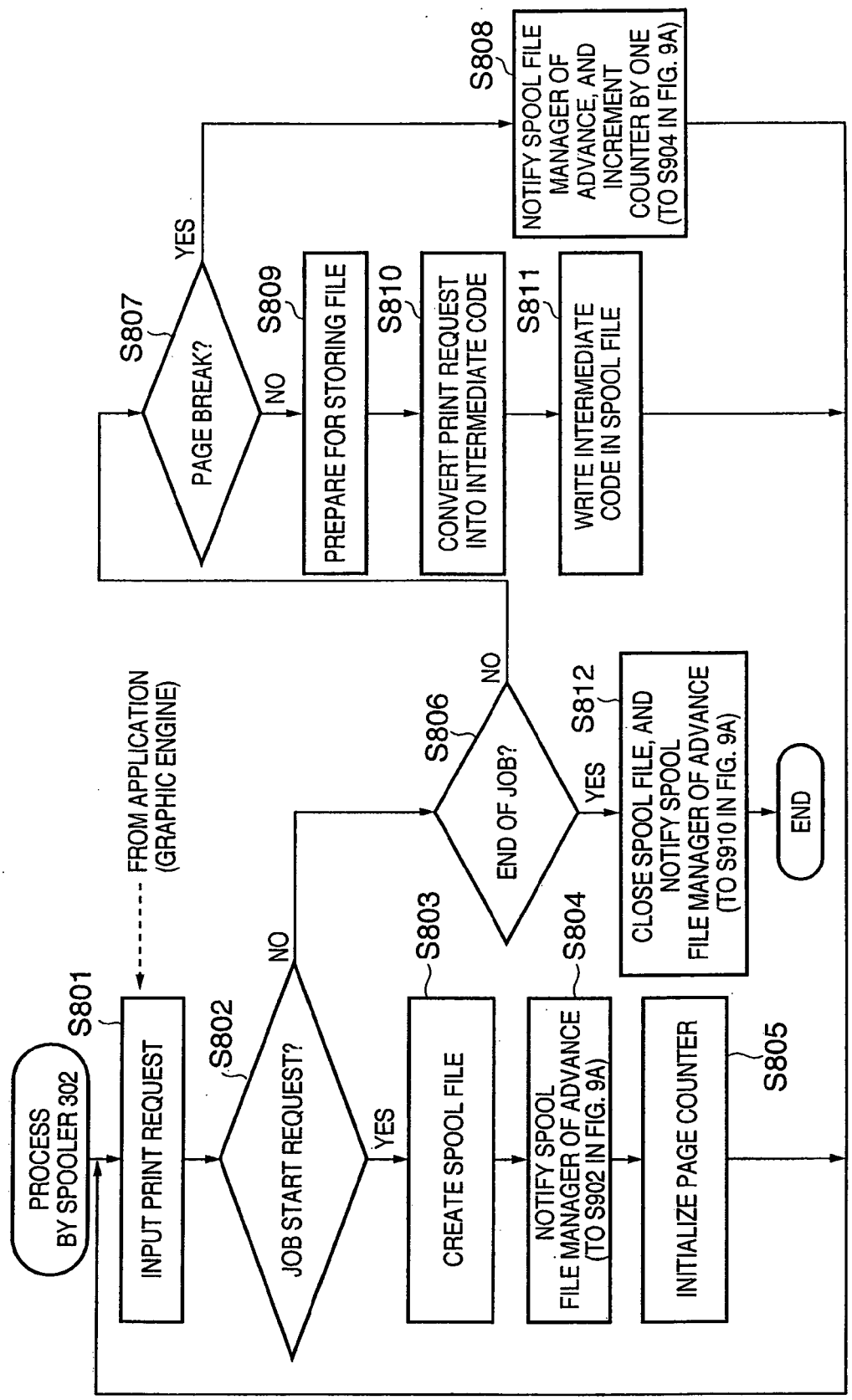
FIG. 8 is a flowchart showing an example of a process by a spooler 302.

FIG. 8 is a flowchart showing the process of a page save step in generation of the spool file 303 by the spooler 302.

In step S801, the spooler 302 accepts a print request from an application via the graphic engine 202. The application can set various print setting items by the UI control unit 203B in the printer driver 203. An example of print settings includes an item of laying out a plurality of logical pages on one physical page, which is implemented using the spool system 300.

In step S802, the spooler 302 determines whether the accepted print request is a job start request. If the spooler 302 determines in step S802 that the accepted print request is a job start request, the flow advances to step S803, and the spooler 302 creates a spool file 303 for temporarily saving intermediate data. In step S804, the spooler 302 notifies the spool file manager 304 of the advance of the printing process. In step S805, the page counter of the spooler 302 is initialized to 1. The spool file manager 304 reads, from the spool file 303, e.g., job information and process settings of a job for which printing starts, and stores the readout information.

If the spooler 302 determines in step S802 that the accepted print request is not a job start request, the flow advances to step S806. In step S806, the spooler 302 determines whether the accepted request is a job end request. If the spooler 302 determines that the accepted request is not a job end request, the flow advances to step S807, and the spooler 302 determines whether the accepted request is a page break request. If the spooler 302 determines in step S807 that the accepted request is a page break request, the flow advances to step S808, and the spooler 302 notifies the spool file manager 304 of the advance of the printing process. The spooler 302 increments the page counter, closes a page drawing file which stores an intermediate code, and generates the next page drawing file.

If the spooler 302 determines in step S807 that the accepted print request is not a page break request, the flow advances to step S809, and the spooler 302 prepares for write of an intermediate code in the page drawing file. In step S810, the spooler 302 converts the DDI function of the print request into an intermediate code in order to store the print request in the spool file 303. In step S811, the spooler 302 writes, in the spool file 303, the print request (intermediate code) which has been converted into a storable format in step S810.

After that, the flow returns to step S801, and the spooler 302 accepts a print request from the application again. Processes in a series of steps S801 to S811 continue until the spooler 302 receives a job end request from the application. At the same time, the spooler 302 acquires information such as process settings from the printer driver 203, and stores it in the spool file 303.

If the spooler 302 determines in step S806 that the print request from the application is a job end request, all print requests from the application have ended. Thus, the flow advances to step S812, and the spooler 302 closes the spool file, notifies the spool file manager 304 of the advance of the printing process, and ends the process.

(Example of Process by Spool File Manager 304)

Figure 9A:
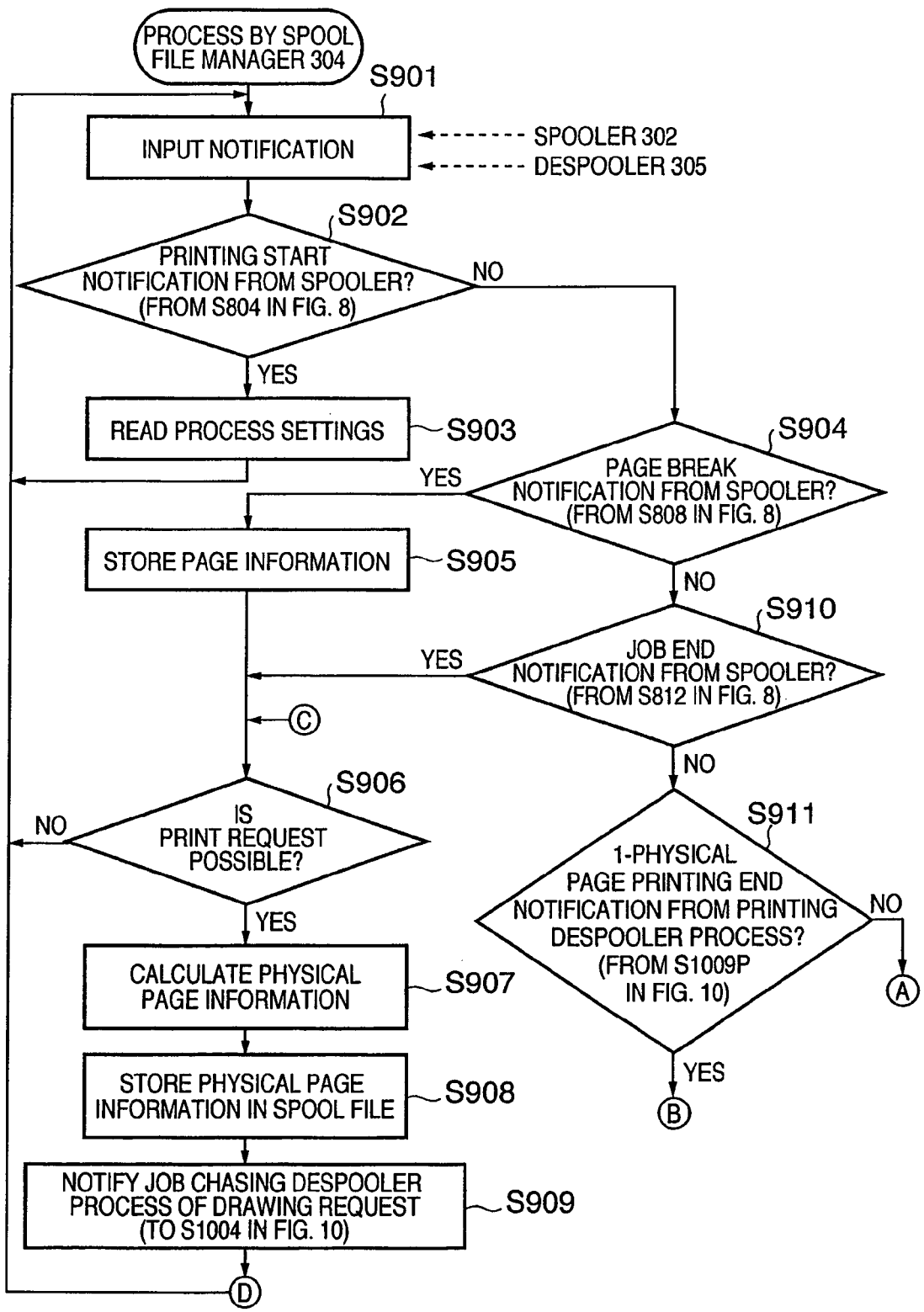
Figure 10:
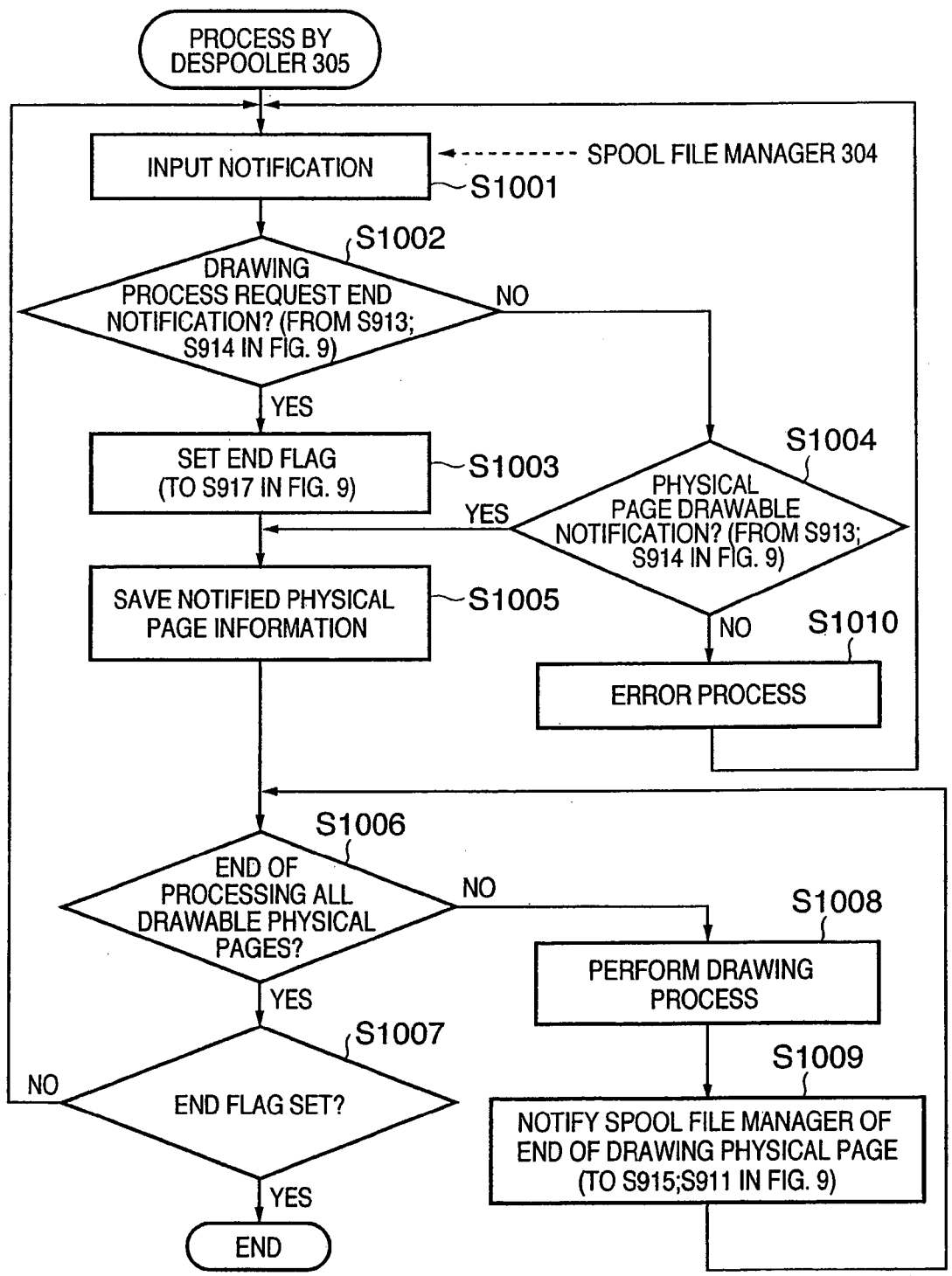
FIG. 10 is a flowchart showing an example of a process by the despooler 305 according to the first embodiment.

FIGS. 9A and 9B are a flowchart showing details of control between the generation process of the spool file 303, a job chasing information generation process (to be described later), and a print data generation process (to be described later) by the spool file manager 304. "M"s are suffixed to steps for notifications from process M among those from the despooler 305, and "P"s are suffixed to steps for notifications from process P.

In step S901, the spool file manager 304 accepts an advance notification from the spooler 302, or an advance notification associated with a printing process or job chasing generation process from the despooler 305.

In step S902, the spool file manager 304 determines whether the advance notification is a printing start notification which has been sent from the spooler 302 in step S804 described above. If YES in step S902, the flow advances to step S903, and the spool file manager 304 reads printing process settings from the spool file 303, and starts job management.

If the spool file manager 304 determines in step S902 that the advance notification is not a printing start notification from the spooler 302, the flow advances to step S904, and the spool file manager 304 determines whether the advance notification is a 1-logical page printing end notification, i.e., logical page break process notification which has been sent from the spooler 302 in step S808 described above. If the spool file manager 304 determines that the advance notification is a 1-logical page printing end notification, the flow advances to step S905 to store logical page information on the logical page, and advances to step S906.

In step S906, the spool file manager 304 determines whether a 1-physical page drawing process can be started for n logical pages which have been spooled at this time. If the spool file manager 304 determines that the drawing process is possible, the flow advances to step S907, and the spool file manager 304 determines a physical page number from the number of logical pages which are laid out on one physical page to be printed. In calculation of the physical page, for example, when the process setting is to lay out four logical pages on one physical page, the first physical page can be printed after the fourth logical page is spooled. The second physical page can be printed after the eighth logical page is spooled. Even if the total number of logical pages is not a multiple of the number of logical pages to be laid out on one physical page, logical pages to be laid out on one physical page can be determined in response to a spool end notification in step S812. If the spool file manager 304 determines in step S906 that the drawing process is impossible, the flow returns to step S901, and the spool file manager 304 waits for the next notification.

In step S908, the spool file manager 304 stores, in the spool file 303, information (e.g., logical page numbers which form a physical page for which the drawing process becomes possible, and the physical page number). In step S909, the spool file manager 304 sends the stored physical page information and a drawing process notification to a despooler process which has been generated for job chasing. When the drawing process request for the first physical page is sent, the process of the despooler 305 has not been generated. Thus, a job chasing process and printing process are generated in this step, and then the request is sent.

The flow returns to step S901, and the spool file manager 304 waits for the next notification. In the first embodiment, the printing process can start after logical pages which form one page of print data, i.e., one physical page are spooled even if spool of the print job is not completed.

The despooler 305 in the first embodiment assumes one physical page as a unit of the printing process. In step S908 described above, pieces of information necessary to perform a printing process for one physical page are sequentially saved in a file and converted into a reusable format. If no information need be reused, the implementation may be changed to use a high-speed medium such as a shared memory, overwrite physical pages one by one, and thereby achieve a higher speed and saving of the resource. When the advance of spool is faster than that of despool or despool starts after the end of spooling all pages, no page printable notification is sent for each physical page in step S909. Instead, a notification that a plurality of physical pages or all physical pages can be printed is sent in accordance with the advance of despool, decreasing the number of notifications.

If the spool file manager 304 determines in step S904 that the advance notification is not a 1-logical page printing end notification, the flow advances to step S910. In step S910, the spool file manager 304 determines whether the advance notification is a job end notification which has been sent from the spooler 302 in step S812 described above. If the advance notification is a job end notification, the flow advances to step S906 described above; if the advance notification is not a job end notification, to step S911.

In step S911, the spool file manager 304 determines whether the accepted notification is a 1-physical page printing end notification from the printing process by the despooler 305. If the accepted notification is a 1-physical page printing end notification, the flow advances to step S912; if the accepted notification is not a 1-physical page printing end notification, to step S915.

In step S912, since the spool file manager 304 has received the 1-physical page printing end notification from the printing process by the despooler 305, it determines whether printing at process settings has ended. If the spool file manager 304 determines that printing has ended, the flow advances to step S913, and the spool file manager 304 notifies the job chasing process by the despooler 305 of the end of the chasing information generation process. The flow then advances to step S914, and the spool file manager 304 notifies the printing process by the despooler 305 of the end of printing. If the spool file manager 304 determines that printing at process settings has not ended, the flow advances to step S906 described above.

If the spool file manager 304 determines in step S911 that the accepted notification is not a 1-physical page printing end notification, the flow advances to step S915. In step S915, the spool file manager 304 determines whether the accepted notification is a 1-physical page drawing process end notification from the job chasing process by the despooler 305. If the accepted notification is a 1-physical page drawing process end notification, a printing process for a corresponding physical page can be performed. Thus, the flow advances to step S916, and the spool file manager 304 requests the printing process by the despooler 305 to print a corresponding physical page. In this way, an actual printing process is executed upon the completion of a drawing process used for job chasing, increasing the reliability of the job chasing system.

If the spool file manager 304 determines in step S915 that the accepted notification is not a 1-physical page drawing process end notification, the flow advances to step S917. In step S917, the spool file manager 304 determines whether the accepted notification is a printing end notification from the despooler 305. If the spool file manager 304 determines that the notification is a printing end notification from the despooler 305, the flow advances to step S918, and the spool file manager 304 deletes a corresponding page drawing file from the spool file 303, and ends the process.

If the notification is not a printing end notification from the despooler 305, the flow advances to step S919, and the spool file manager 304 performs a normal process, error process, or the like, and waits for the next notification.

(Example of Process by Despooler 305)

FIG. 10 is a flowchart showing details of a drawing data generation process by the despooler 305. The despooler 305 reads out necessary information from the spool file 303 and generates drawing data in response to a print request from the spool file manager 304. A method of transferring generated drawing data to the printer has been described with reference to FIGS. 4B and 6.

As described with reference to FIGS. 7, 9A and 9B, the despooler 305 is used for two purposes: output of job chasing information and output of print data. As for the drawing method, the output destination changes, and the size and compression method of data generated by the graphic engine 202 are different between chasing data (in image extraction) and print data. However, drawing contents to be printed and drawing contents held by chasing data are identical. By printing chasing data by the same processing system as that of actual printing, the reliability of chasing data can increase. The flow of a process by the despooler 305 that is common to processes M and P will be described.

In step S1001, the despooler 305 receives the above-mentioned notification from the spool file manager 304. In step S1002, the despooler 305 determines whether the input notification is a job end notification. If the input notification is a job end notification, the flow advances to step S1003 to set an end flag, and then to step S1005.

If the despooler 305 determines in step S1002 that the input notification is not a job end notification, the flow advances to step S1004, and the despooler 305 determines whether it has received a 1-physical page drawing start request in step S909 or S916 described above. If the despooler 305 determines in step S1004 that it has not received any 1-physical page drawing start request, the flow advances to step S1010 to perform an error process, and returns to step S1001 to wait for the next notification.

If the despooler 305 determines in step S1004 that it has received a 1-physical page printing start request, the flow advances to step S1500, and the despooler 305 saves, in the RAM 2 or the like, printable physical page information which has been received in step S1005. In step S1006, the despooler 305 determines whether all physical pages saved in step S1005 have been printed. If all physical pages have been printed, the flow advances to step S1007, and the despooler 305 determines whether the end flag has been set in step S1003 described above. If the end flag has been set, the despooler 305 determines that printing of the job has ended, notifies the spool file manager 304 of the end of the process by the despooler 305, and ends the process. If the despooler 305 determines in step S1007 that no end flag has been set, the flow returns to step S1001 to wait for the next notification.

If the despooler 305 determines in step S1006 that a printable physical page remains, the flow advances to step S1008, and the despooler 305 sequentially reads out pieces of unprocessed physical page information from the saved physical page information, and reads and processes information necessary to generate drawing data.

As described with reference to FIG. 4B, in the drawing process by the despooler 305, a drawing request command stored in the spool file 303 is converted into a format (GDI function) which can be recognized by the graphic engine 202, and transferred. For example, for a process setting of laying out a plurality of logical pages on one physical page, a drawing request command is converted in this step in consideration of the reduced layout. Also in the process of FIG. 10, the despooler 305 sets, for the graphic engine 202 via an API, setting information (CreateDC( ): in a printing process, CreateCompatibleDC( ): in chasing data generation) which changes depending on the process purpose, as described in the process of FIG. 6.

After a necessary printing process ends, the despooler 305 notifies in step S1009 the spool file manager 304 of the end of generating 1-physical page print data. The flow returns to step S1006 again to sequentially repeat the drawing process for physical pages which have been saved in step S1005 and can undergo the drawing process.

<Example of Communication Between Despooler 305 and Job Chasing Function Processing Unit 402>

Figure 11:
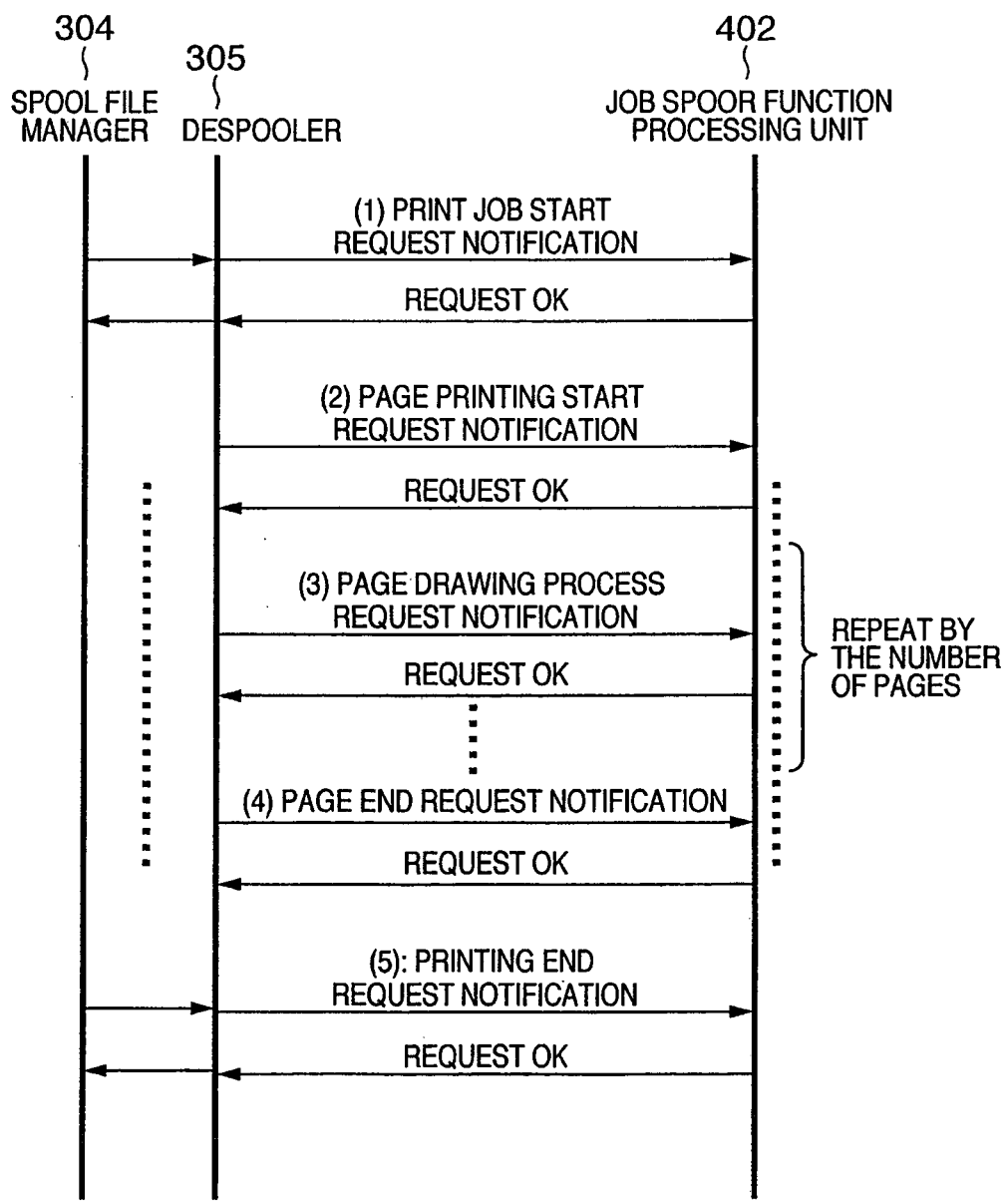
FIG. 11 is a chart showing an example of a communication process between the despooler 305 and a job chasing function unit 402.

FIG. 11 is a chart for explaining communication between the despooler 305 and the job chasing function processing unit 402. Note that the despooler 305 is controlled by the spool file manager 304, instructed by the spool file manager 304 to issue a request notification, and transmits a response to a request to the spool file manager 304.

The despooler 305 sends a request corresponding to the drawing request described with reference to FIG. 10 to the job chasing function processing unit 402. The despooler 305 is notified by the job chasing function processing unit 402 that a process in response to each request has normally ended, and then notifies the spool file manager 304 of the advance of the process.

In (1) of FIG. 11, a process is generated at the start of a drawing process for the first physical page in step S909 of FIG. 9A. (2) to (4) are processes which are repeated by the number of physical pages, and correspond to the notification process in steps S909 and S915. (5) corresponds to a process which is executed in step S913.

(Example of Process by Job Chasing Function Processing Unit 402)

Figure 12:
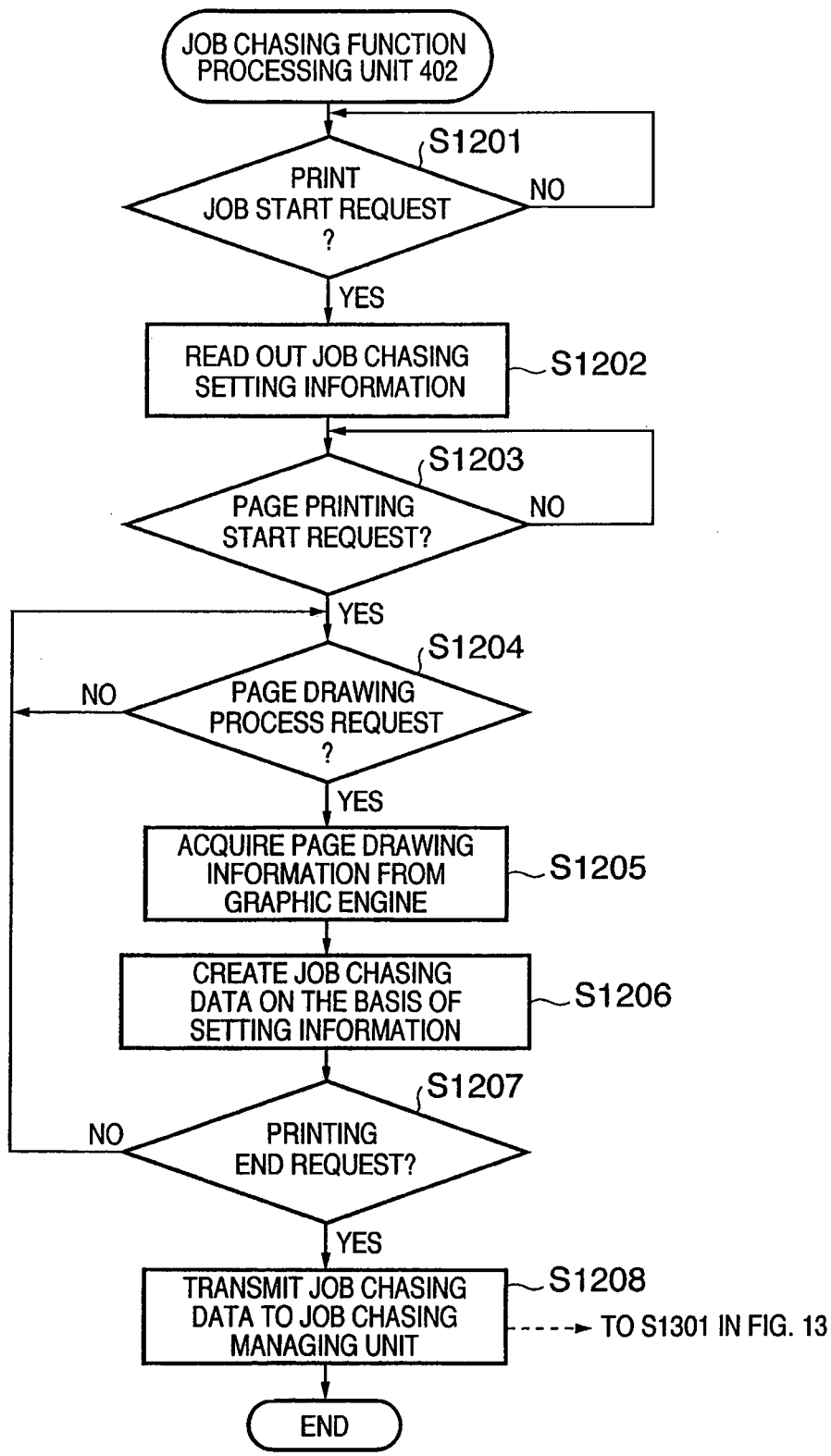
FIG. 12 is a flowchart showing an example of a process by the job chasing function processing unit 402.

FIG. 12 is a flowchart schematically showing an example of a process by the job chasing function processing unit 402.

In step S1201, as represented by (1) in FIG. 11, the job chasing function processing unit 402 waits for a print job start request from the spool file manager 304 via the despooler 305. Upon reception of the print job start request, in step S1202, the job chasing function processing unit 402 reads out job chasing setting information which has been set from the setting window of FIG. 5B and stored in the job chasing setting information area 2d of FIG. 2B.

In step S1203, the job chasing function processing unit 402 waits for a page printing start request represented by (2) in FIG. 11. Upon reception of the page printing start request, the flow advances to step S1204, and the job chasing function processing unit 402 waits for a page drawing process request for each page. Upon reception of the page drawing process request, the flow advances to step S1205, and the job chasing function processing unit 402 acquires page drawing information containing bitmap data which has been mapped, similarly to data transmitted from the graphic engine 202 to the printer 1500, from intermediate code data that has been read out from the spool file 303 by the despooler 305 and sent to the graphic engine 202. In step S1206, the job chasing function processing unit 402 creates chasing managing information from the page drawing information in accordance with the job chasing setting information read out in step S1202. In step S1207, the job chasing function processing unit 402 determines whether it has received a printing end request represented by (5) in FIG. 11 from the despooler 305. If the job chasing function processing unit 402 has not received any printing end request, the flow returns to step S1204, and the job chasing function processing unit 402 creates job chasing information for the next page.

Upon reception of the printing end request, the flow advances to step S1208, and the job chasing function processing unit 402 transfers the created job chasing information (job chasing creation data in FIG. 2B) to the job chasing managing unit 500. A process by the job chasing managing unit 500 after receiving the job chasing information will be explained next with reference to FIG. 13.

By the flow shown in FIG. 12, job chasing information of one print job is created and transferred to the job chasing managing unit 500. In actual operation, a plurality of print jobs may be successively executed. In this case, the flow in FIG. 12 may be repeated to transfer job chasing information to the job chasing managing unit 500 for each print job, or job chasing information may be transferred to the job chasing managing unit 500 after a series of print jobs end. In this case, the job chasing function processing unit 402 waits between steps S1207 and S1208 for a series of end notifications for a plurality of print jobs.

(Example of Process by Job Chasing Managing Unit 500)

Figure 13:
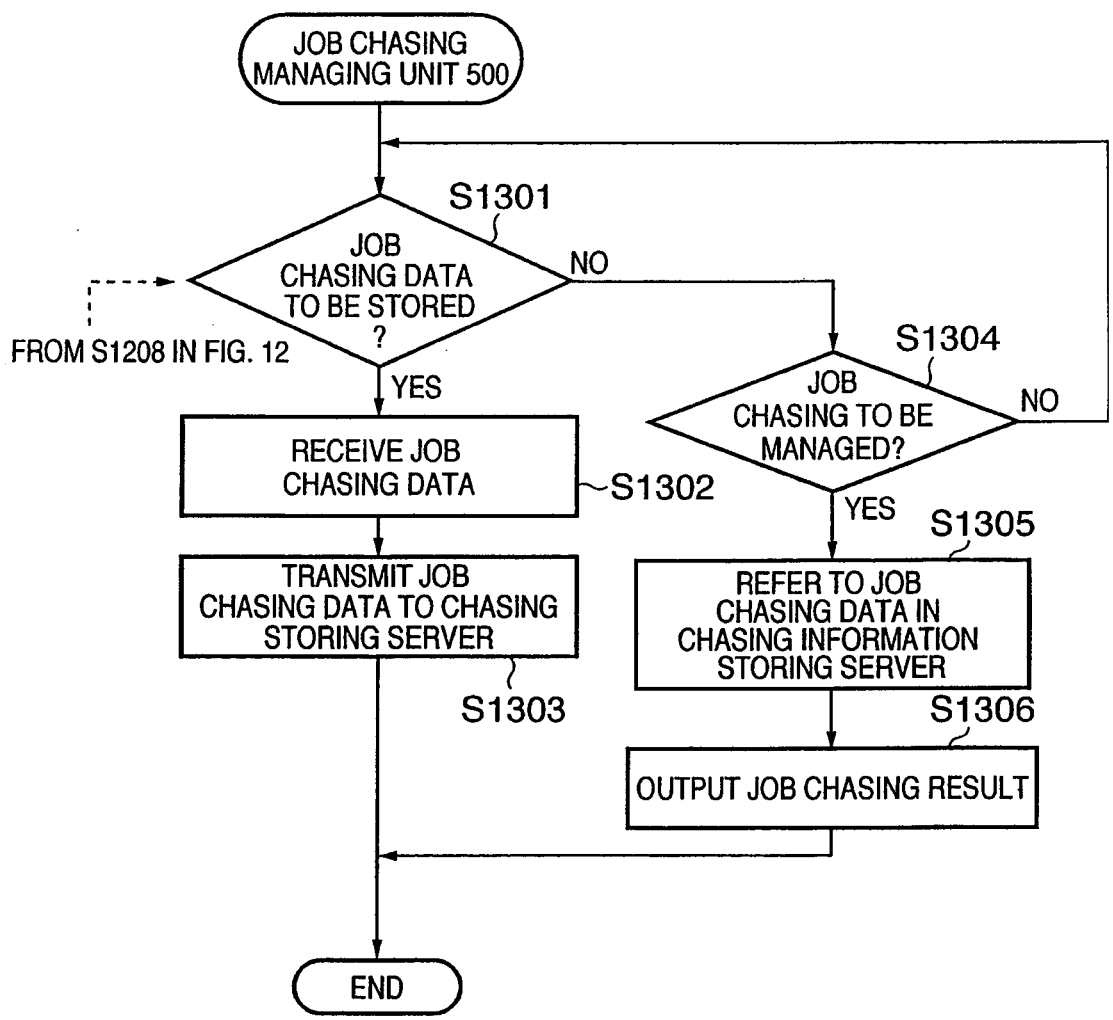
FIG. 13 is a flowchart showing an example of a process by a job chasing managing unit 500.

FIG. 13 is a flowchart schematically showing an example of a process by the job chasing managing unit 500. Note that a job chasing managing process can adopt an existing process, and a detailed description thereof will be omitted.

In steps S1301 and S1304, the job chasing managing unit 500 determines whether the received request is a job chasing information storing request from the job chasing function processing unit 402 or a request for a job chasing managing process (search, collation, or the like) based on stored job chasing information.

If job chasing information has been transmitted, the flow advances to step S1302, and the job chasing managing unit 500 receives the job chasing information from the job chasing function processing unit 402. In step S1303, the job chasing managing unit 500 stores the job chasing information in the chasing data storing server 1000 for each job so that the job can be chased or be chased. If the job chasing managing unit 500 has received the job chasing managing process request, the flow advances to step S1305, and the job chasing managing unit 500 refers to job chasing information in the chasing data storing server 1000 for each job in accordance with a managing client name and identification name which are set in FIG. 5B. In step S1306, the job chasing managing unit 500 outputs a job chasing result.

When the job chasing managing unit 500 exists in the host computer 3000, the job chasing managing process may be designated to the job chasing managing unit 500 via the application 201 or directly via the UI, or designated via the UI control unit 203B of the printer driver 203 or the job chasing function UI control unit 401. When a chasing managing computer serving as the managing client 4000 exists in addition to the host computer 3000, the job chasing managing process is designated via the network.

[Second Embodiment]

In the first embodiment, as shown in FIG. 7, the two processes M and P for the despooler 305 are generated, and the spool file manager 304 controls these two despooler processes M and P. Alternatively, the despooler 305 may control these two processes M and P. This can also be implemented by slightly changing the process flows in FIGS. 9A, 9B and 10. Changed steps will be explained with reference to FIGS. 12 and 13.

Figure 14A:
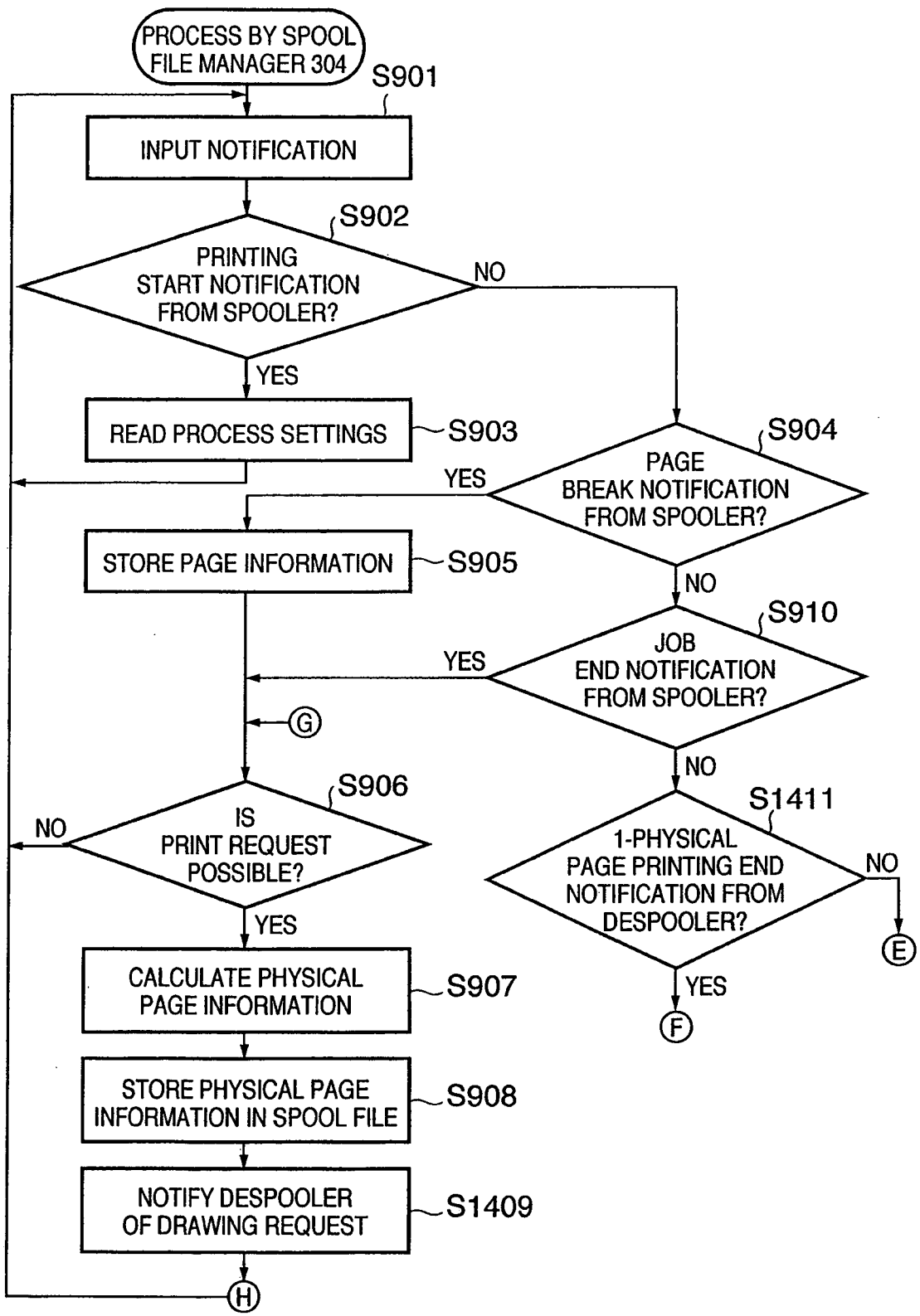
FIGS. 14A and 14B are a flowchart showing an example of a process by a spool file manager 304 according to the second embodiment.
Figure 14B:
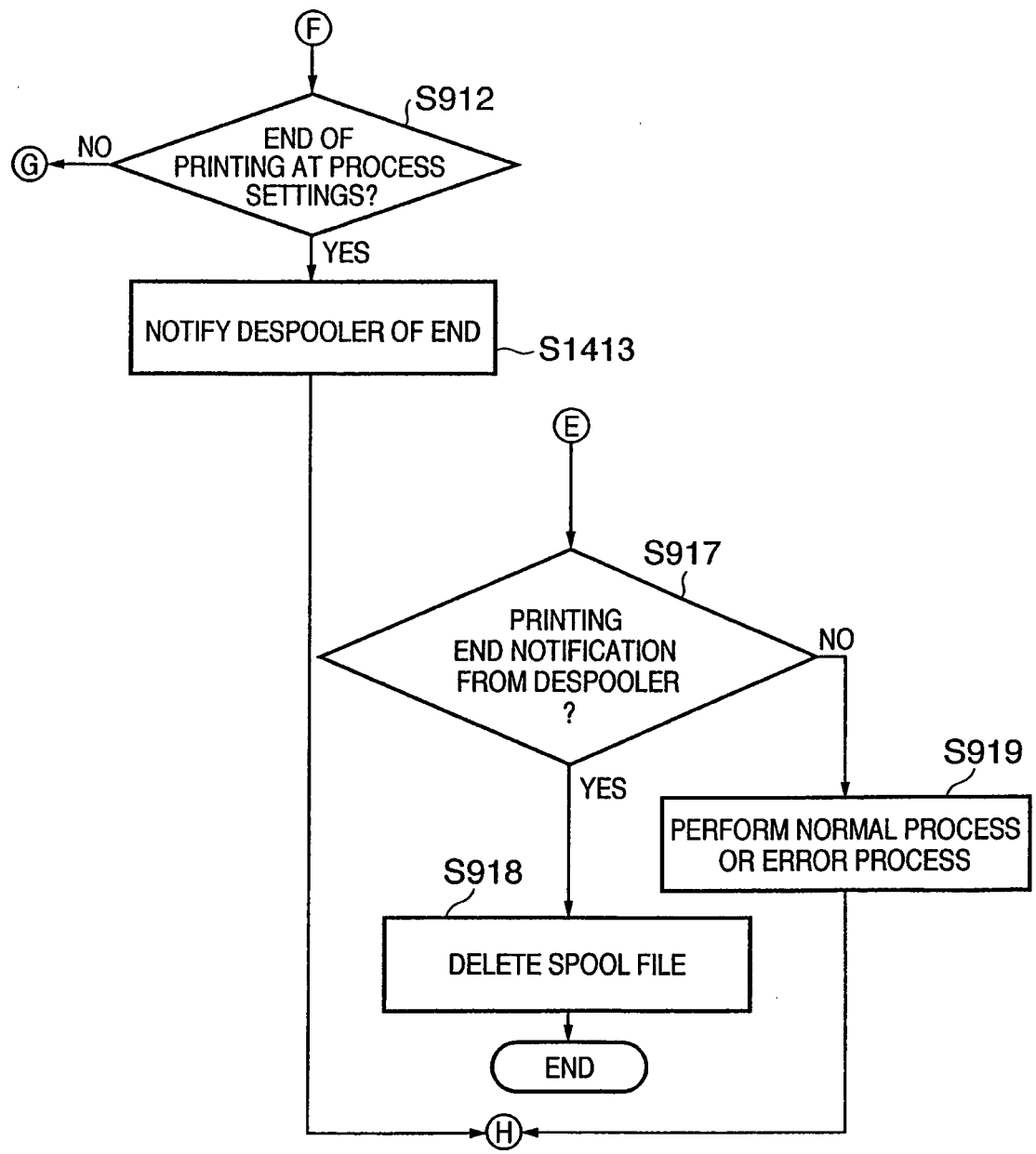
Figure 15:
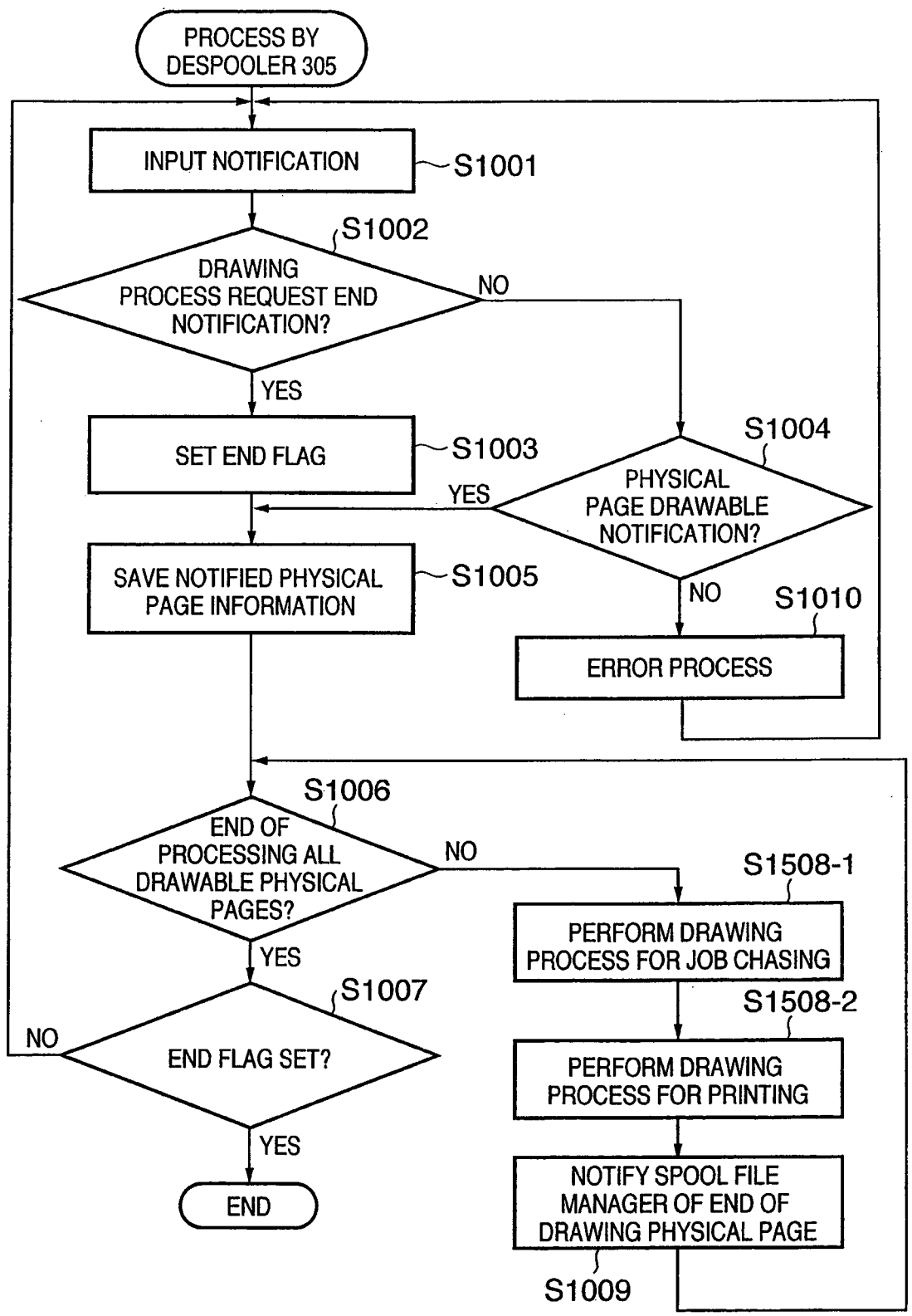
FIG. 15 is a flowchart showing an example of a process by a despooler 305 according to the second embodiment.

FIGS. 14A, 14B and 15 are a flowchart which reflects steps changed from FIGS. 9A and 9B in a spool file manager 304. FIG. 15 is a flowchart which reflects steps changed from FIG. 10 in a despooler 305.

In FIG. 14B, processes in steps S915 and S916 in FIG. 9B are moved to the despooler 305 side. These processes are moved to step S1008 in FIG. 10, and executed as steps S1508-1 and S1508-2 in FIG. 15.

Step S909 in FIG. 9A simply changes to a request (step S1409) to the despooler 305, without any consciousness of a job chasing despool process. In steps S913 and S914 in FIG. 9B, no notification need be individually issued, and a notification is simply issued to the despooler 305 (step S1413).

In the second embodiment, in step S615 of FIG. 6, the despooler 305 generates and transfers print data not in response to an instruction from the spool file manager 304, but in the process of the despooler 305.

[Examples of Operation Forms of Various System Configurations]

FIGS. 16A to 16E are views for explaining operation forms in various systems according to the present invention.

Figure 16A:
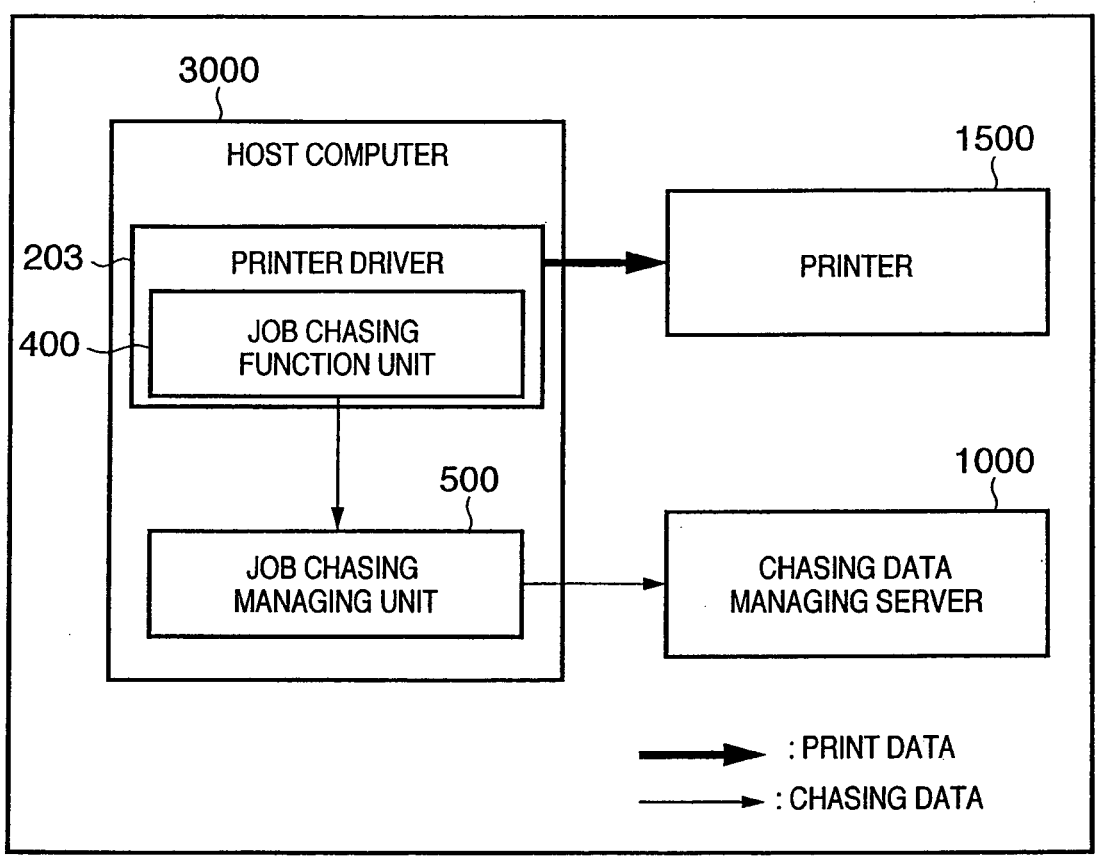
FIG. 16A is a block diagram showing an example of the form of the job chasing function of the system according to the embodiment.

FIG. 16A is a block diagram showing the simplest operation example of the present invention. A job chasing managing unit 500 is arranged in a host computer 3000. Print data is directly transferred from a printer driver 203 to a printer 1500, and chasing data is sent from a job chasing function unit 400 to a chasing data storing server 1000 via the job chasing function managing unit 500 in the host computer 3000. This configuration is the minimum configuration for practicing the present invention. The first embodiment has described a form using this configuration.

Figure 16B:
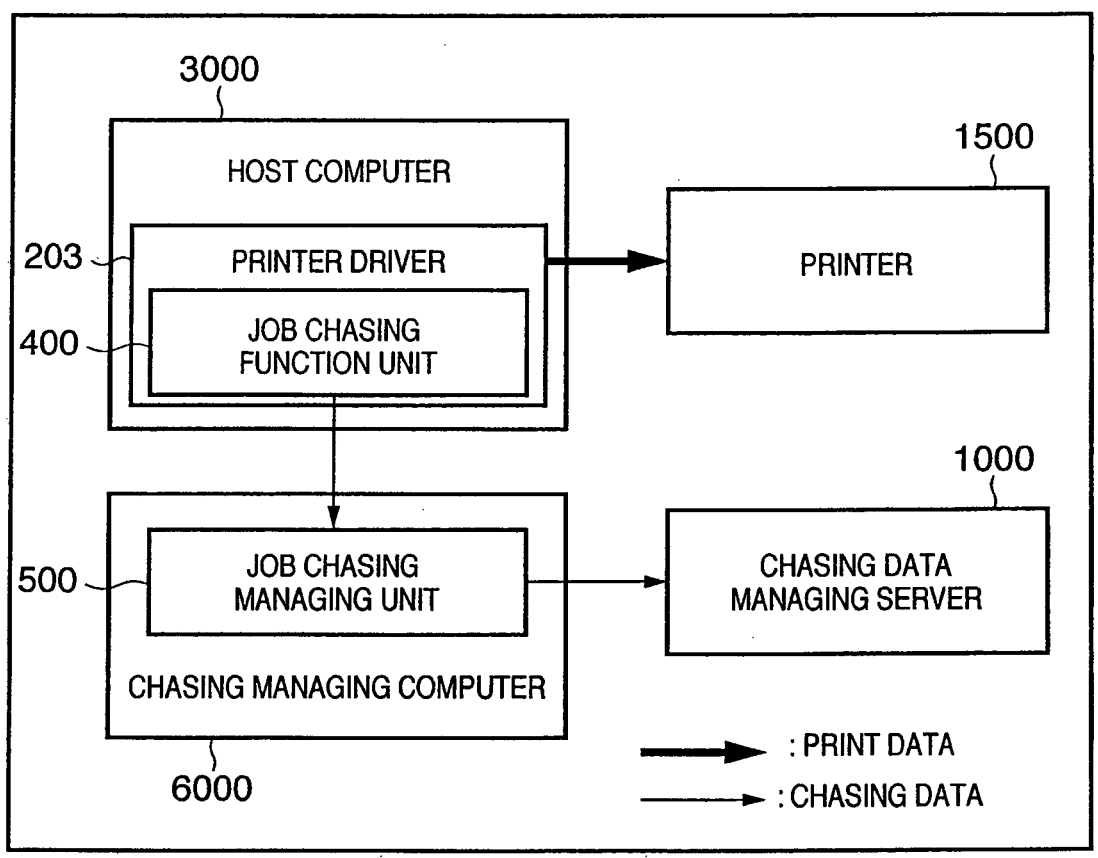
FIG. 16B is a block diagram showing an example of the form of the job chasing function of another system to which the present invention can be applied.

In FIG. 16B, unlike FIG. 16A, the job chasing managing unit 500 is arranged in a chasing managing computer 6000 different from the host computer 3000. Similar to FIG. 16A, print data is directly transferred from the printer driver 203 to the printer 1500. Chasing data is sent from the job chasing function unit 400 to the chasing data storing server 1000 via the job chasing function managing unit 500 in the chasing managing computer 6000. With this configuration, the chasing data storing server 1000 for chasing data can be scheduled on, e.g., a date or time period when the network load reduces. The load on the chasing data storing server 1000 can be controlled.

In FIG. 16C, unlike FIG. 16A, a print server 7000 is interposed between the host computer 3000 and the printer 1500. Print data is transferred from the printer driver 203 to the printer 1500 via a corresponding printer queue (print spooler) of the print server 7000. Similar to FIG. 16A, chasing data is sent from the job chasing function unit 400 to the chasing data storing server 1000 via the job chasing function managing unit 500 in the host computer 3000. With this configuration, the present invention can also be applied to an operation form using the print server 7000. By arranging the printer driver 203 in the print server 7000, distribution of the printer driver to the host computer 3000, synchronization of the printer driver, and sharing of setting information can be achieved. Various settings of the job chasing function can also be managed at once in the print server 7000. A mechanism which inhibits a user who is not authorized to execute various settings of the job chasing function from changing settings can also be provided.

FIG. 16D shows a combination of the configurations in FIGS. 16B and 16C. The print server 7000 is interposed between the host computer 3000 and the printer 1500, and the job chasing managing unit 500 is arranged in the chasing managing computer 6000 different from the host computer 3000. Similar to FIG. 16C, print data is transferred from the printer driver 203 to the printer 1500 via a corresponding printer queue (print spooler) of the print server 7000. Similar to FIG. 16B, chasing data is sent from the job chasing function unit 400 to the chasing data storing server 1000 via the job chasing function managing unit 500 in the chasing managing computer 6000. With this configuration, the advantages of the configurations in FIGS. 16B and 16C can be obtained.

Figure 16E:
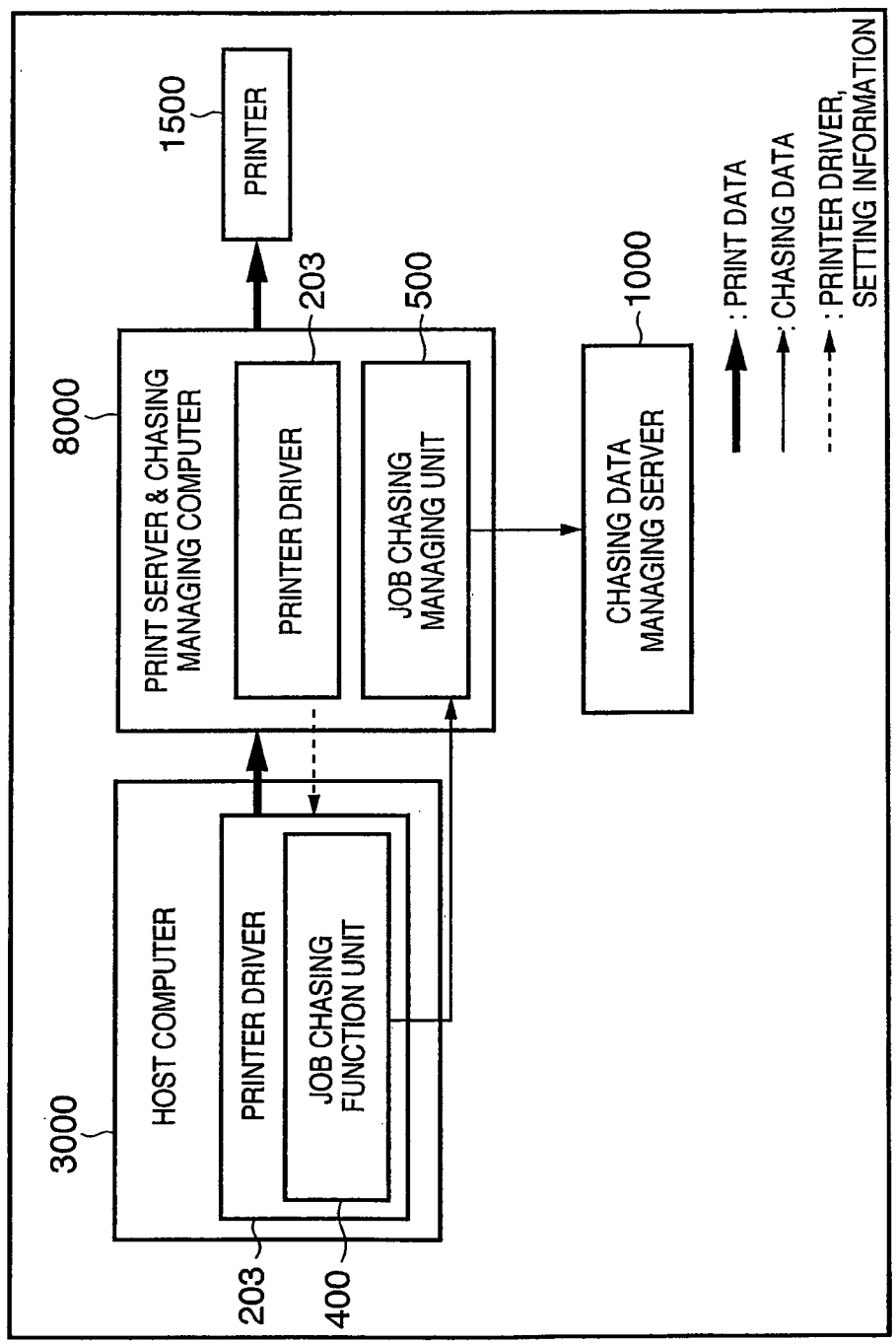
FIG. 16E is a block diagram showing an example of the form of the job chasing function of still another system to which the present invention can be applied.

In FIG. 16E, a print server & chasing managing computer 8000 is so arranged as to implement the chasing managing computer 6000 and print server 7000 in FIG. 16D in the same computer. Print data is transferred from the printer driver 203 to the printer 1500 via a corresponding printer queue (print spooler) of the print server & chasing managing computer 8000. Chasing data is sent from the job chasing function unit 400 to the chasing data storing server 1000 via the job chasing function managing unit 500 in the print server & chasing managing computer 8000. With this configuration, two computers, the chasing managing computer 6000 and print server 7000 in FIG. 16D can be combined into one print server & chasing managing computer 8000, reducing the installation space and cost.

The present invention can be applied to various forms as described above. Not only the minimum configuration in FIG. 16A described in the above embodiment, but also a flexible system configuration which complies with an installation form can be provided.

The present invention may be applied to a system including a plurality of devices (e.g., a computer, interface device, reader, and printer) or an apparatus including a single device (e.g., a copying machine, printer, or facsimile apparatus).

The object of the present invention is achieved even by supplying a storage medium which stores program codes to implement the procedures of the flowcharts in the above-described embodiments to the system or apparatus and causing the computer (or CPU or MPU) of the system or apparatus to read out and execute the program codes stored in the storage medium.

In this case, the program codes read out from the storage medium implement the functions of the above-described embodiments by themselves, and the storage medium which stores the program codes constitutes the present invention.

As the storage medium to supply the program codes, for example, a floppy® disk, hard disk, optical disk, magnetooptical disk, CD-ROM, CD-R, magnetic tape, nonvolatile memory card, or ROM can be used.

The functions of the above-described embodiments are implemented not only when the readout program codes are executed by the computer but also when the OS (Operating System) running on the computer performs some or all of actual processes on the basis of the commands of the program codes.

The functions of the above-described embodiments are also implemented when the program codes read out from the storage medium are written in the memory of a function expansion board inserted into the computer or the memory of a function expansion unit connected to the computer, and the CPU of the function expansion board or function expansion unit performs some or all of actual processes on the basis of the commands of the program codes.

As many apparently widely different embodiments of the present invention can be made without departing from the spirit and scope thereof, it is to be understood that the invention is not limited to the specific embodiments thereof except as defined in the appended claims.

Claim of Priority

This application claims priority from Japanese Patent Application No. 2004-339440 filed on Nov. 24, 2004, which is hereby incorporated by reference herein.

What is claimed is:

1. An information processing apparatus which generates a print job to be printed by a printing apparatus, comprising:
a storage unit that stores a drawing command output by an application as the print job;
a first generation unit that executes a first generation process to generate first data for chasing a print job, the first data includes second data indicating print concern information and third data for making it possible to distinguish contents of print data corresponding to each page of the plurality of pages contained in the print job, wherein the second data is generated in response to a start command of the print job that is read out prior to a generation of the print data using the drawing command read out from the storage unit and the third data is generated by using the drawing command read out from the storage unit after the start command;
a second generation unit that executes a second generation process for generating print data of each page of the plurality of pages contained in the print job by using the drawing command read out from the storage unit;
a control unit that controls the first generation unit and the second generation unit to alternately execute the first generation process for one page of the plurality of pages and the second generation process for one page of the plurality of pages, until the first data and the print data corresponding to the print job have been generated; and
an output unit that outputs the first data to a management device that accumulates the first data so as to be able to manage the first data corresponding to print jobs,
wherein the print concern information includes environment information, being different from an attribute on the print job, for identifying a client name and information for discriminating a connection with a printing apparatus,
wherein the first generation unit executes the first generation process by generating the third data according to control information for controlling generation of the third data that is related to each page of the plurality of pages contained in the print job, and
wherein the control information includes a designation of attribute or format of the third data.

2. The apparatus according to claim 1, wherein the control unit sequentially reads out drawing commands from the storage unit and outputs the drawing commands to the first generation unit and the second generation unit.

3. The apparatus according to claim 2, wherein the control unit repetitively reads out and outputs drawing commands of the same physical page so as to alternately execute, for each physical page, the first generation process for one page of the plurality of pages by the first generation unit and the second generation process for one page of the plurality of pages by the second generation unit.

4. The apparatus according to claim 1, wherein the control information is set by using a user interface of a printer driver and the control information is different from print settings used for the second generation process.

5. The apparatus according to claim 1, wherein the first generation unit generates the third data by using a text part extracted from the drawing command read out from the storage unit, when a designation of extraction of a text is included in the control information, and generates, as the third data, bitmap data of each page on the basis of the drawing command read out from the storage unit, when a designation of extraction of an image is included in the control information.

6. The apparatus according to claim 1, wherein the first generation unit executes the first generation process according to the control information including at least one of a bit count different between a color page and a monochrome page, a designated resolution, a designated compression method and a designated encoding method.

7. The apparatus according to claim 1, wherein the first generation unit executes the first generation process of one page by outputting the drawing command read out from the storage unit to a graphic engine unit and causes the graphic engine unit to process the drawing command, and the second generation unit executes the second generation process for each page by outputting the drawing command read out from the storage unit to the graphic engine unit and causes the graphic engine unit to process the drawing command.

8. The apparatus according to claim 1, wherein the control unit controls to execute printing of the print data of an arbitrary page generated by the second generation unit after the first generation unit has executed the first generation process of the arbitrary page.

9. The apparatus according to claim 1, further comprising a transfer unit that transfers the print data generated by the second generation unit to the printing apparatus, wherein the transfer unit transfers print data of one page to the printing apparatus when the second generation unit has generated the print data of one page.

10. A method of protecting leakage of information in an information processing apparatus which generates a print job to be printed by a printing apparatus, comprising:

a first generation step of executing a first generation process to generate first data for chasing a print job, the first data includes second data indicating print concern information and third data for making it possible to distinguish contents of print data corresponding to each page of the plurality of pages contained in the print job, wherein the second data is generated in response to a start command of the print job that is read out prior to a generation of the print data using a drawing command read out from a storage unit that stores a drawing command output by an application as the print job and the third data is generated by using the drawing command read out from the storage unit, after the start command;

a second generation step of executing a second generation process for generating print data of each page of the plurality of pages contained in the print job by using the drawing command read out from the storage unit;

a control step of controlling the first generation step and the second generation step to alternately execute the first generation process for one page of the plurality of pages and the second generation process for one page of the plurality of pages, until the first data and the print data corresponding to the print job have been generated; and an output step of outputting the first data to a management device that accumulates the first data so as to be able to manage the first data corresponding to print jobs, wherein the print concern information includes environment information, being different from an attribute on the print job, for identifying a client name and information for discriminating a connection with a printing apparatus, wherein the first generation unit executes the first generation process by generating the third data according to control information for controlling generation of the third data that is related to each page of the plurality of pages contained in the print job, and wherein the control information includes a designation of attribute or format of the third data.

11. The method according to claim 10, wherein the control step sequentially reads out drawing commands from the storage unit and outputs the drawing commands to the first generation step and the second generation step.

12. The method according to claim 11, wherein the control step repetitively reads out and outputs drawing commands of the same physical page so as to alternately execute, for each physical page, the first generation process for one page of the plurality of pages in the first generation step and the second generation process for one page of the plurality of pages in the second generation step.

13. The method according to claim 10, wherein the control information is set by using a user interface of a printer driver and the control information is different from print settings used for the second generation process.

14. The method according to claim 10, wherein in the first generation step, the third data is generated by using a text part from the drawing command read out from the storage unit, when a destination of extraction of a text is included in the control information, and bitmap data of each page is generated, as the third data, on the basis of the drawing command read out from the storage unit, when a destination of extraction of an image is included in the control information.

15. The method according to claim 10, wherein in the first generation step, the first generation process is executed according to the control information including at least one of a bit count which changes between a color page and a monochrome page, a designated resolution, a designated compression method and a designated encoding method.

16. The method according to claim 10, wherein in the first generation step, the first generation process of one page is executed by outputting the drawing command read out from the storage unit to a graphic engine unit and causing the graphic engine unit to process the drawing command, and in the second generation step, the second generation process for each page is executed by outputting the drawing command read out from the storage unit to the graphic engine unit and causing the graphic engine unit to process the drawing command.

17. A non-transitory computer-readable storage medium which stores a computer program for causing a computer to execute the method of protecting leakage of information according to claim 10.

18. The method according to claim 10, wherein the second generation process of a predetermined page in the second generation step after the first generation process of the predetermined page in the first generation step has completed.

* * * * *